US012627341B2

(12) United States Patent (10) Patent No.: US 12,627,341 B2
Pezeshki et al. (45) Date of Patent: May 12, 2026

(54) NETWORK-ASSISTED BEAMFORMING

(71) Applicant: QUALCOMM Incorporated, San Diego, CA (US)

(72) Inventors: Hamed Pezeshki, San Diego, CA (US); Arumugam Chendamarai Kannan, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 18/461,396

(22) Filed: Sep. 5, 2023

(65) Prior Publication Data

US 2025/0080180 A1 Mar. 6, 2025

(51) Int. Cl.
H04B 7/06 (2006.01)
H04B 7/08 (2006.01)
H04B 17/318 (2015.01)

(52) U.S. Cl.
CPC ........... H04B 7/0617 (2013.01); H04B 7/063 (2013.01); H04B 7/0695 (2013.01); H04B 7/088 (2013.01); H04B 17/318 (2015.01)

(58) Field of Classification Search
CPC .. H04B 7/04026; H04B 7/0408; H04B 7/045; H04B 7/0478; H04B 7/0617; H04B 7/063; H04B 7/0695; H04B 7/06952; H04B 7/06966; H04B 7/088; H04B 17/309; H04B 17/318
USPC ....... 375/219, 220, 224, 225, 227, 259, 260, 375/267; 370/328, 329, 335, 342
See application file for complete search history.

(56) References Cited

U.S. PATENT DOCUMENTS

| | | | |
|---|---|---|---|
| 2017/0317866 A1* | 11/2017 | Stirling-Gallacher | ...................... H04B 7/088 |
| 2018/0331748 A1* | 11/2018 | Hwang | ................. H04W 16/28 |
| 2019/0089441 A1* | 3/2019 | Sivahumaran | ....... H04B 7/0626 |
| 2021/0021322 A1* | 1/2021 | Kuo | ...................... H04L 5/0048 |
| 2021/0227552 A1* | 7/2021 | Abedini | ............. H04W 72/541 |
| 2022/0095145 A1* | 3/2022 | Sakhnini | ............... H04W 24/10 |
| 2022/0141676 A1* | 5/2022 | Wang | .................... H04W 72/02 370/329 |
| 2023/0081802 A1 | 3/2023 | Stirling-Gallacher et al. | |
| 2023/0096117 A1* | 3/2023 | Pezeshki | ............... H04L 5/0057 370/329 |

(Continued)

OTHER PUBLICATIONS

International Search Report and Written Opinion—PCT/US2024/041911—ISA/EPO—Nov. 15, 2024.

*Primary Examiner* — Young T. Tse
(74) *Attorney, Agent, or Firm* — Arent Fox Schiff, LLP

(57) ABSTRACT

Aspects of the disclosure are directed to methods and techniques for wireless communication via non-codebook beam directions to allow dynamic beamforming using non-codebook beam directions. In certain aspects, a user equipment (UE) may obtain, from a wireless node, a plurality of reference signals (RSs) via one or more receive beams, wherein each of the one or more receive beams is characterized by one of a plurality of codebook beam directions. In certain aspects, the UE may estimate a first non-codebook beam direction of a transmit beam of the wireless node based on a measurement of one or more RSs of the plurality of RSs. In certain aspects, the UE may output a report comprising an indication of the first non-codebook beam direction for transmission to the wireless node.

22 Claims, 14 Drawing Sheets

(56) References Cited

U.S. PATENT DOCUMENTS

| 2023/0189027 A1* | 6/2023 | Huang | H04B 7/0456 |
| | | | 370/329 |
| 2023/0283337 A1* | 9/2023 | He | H04B 7/0617 |
| | | | 370/252 |
| 2024/0064724 A1* | 2/2024 | Zhu | H04B 7/04026 |

* cited by examiner

700

702

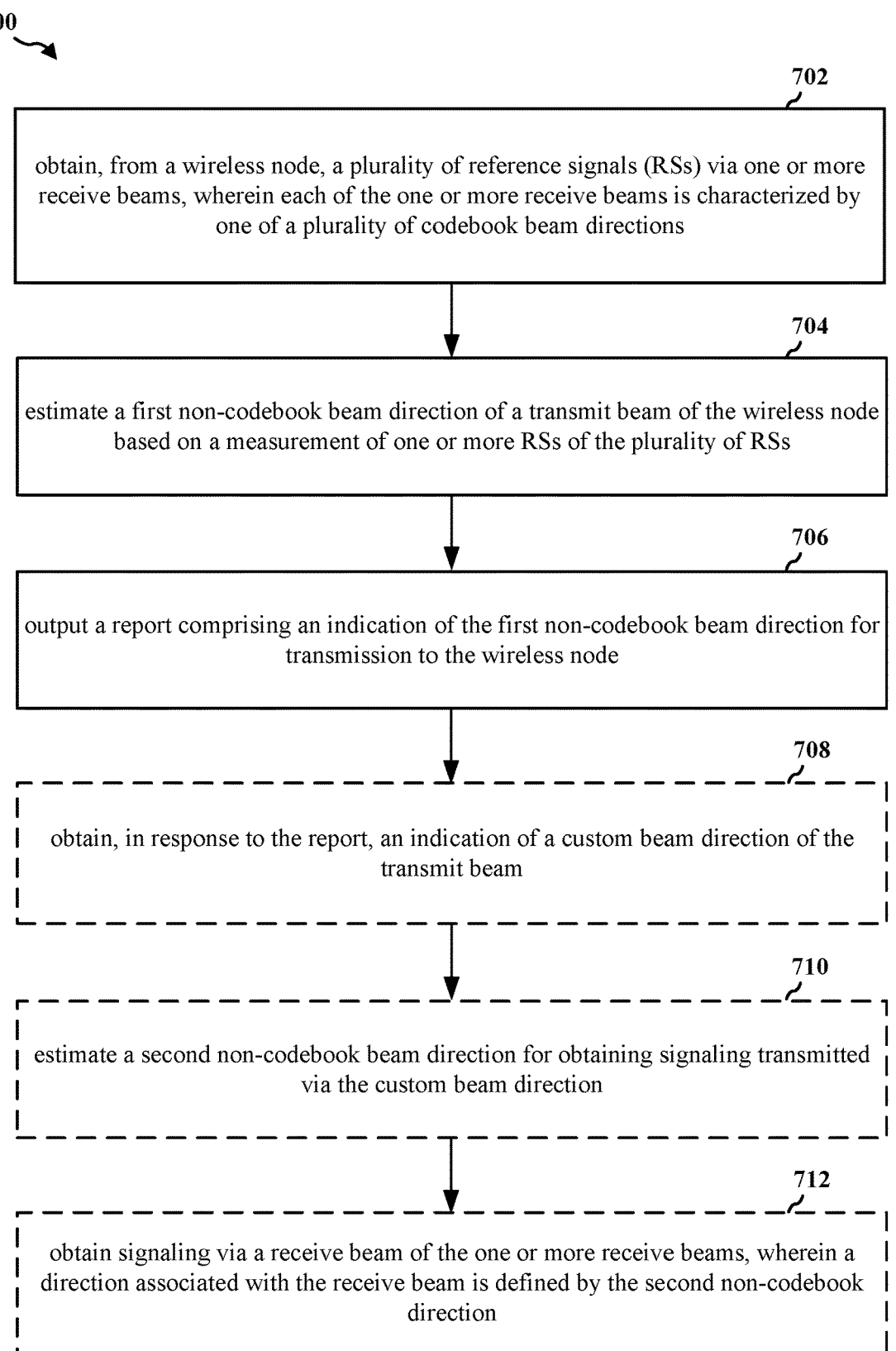

obtain, from a wireless node, a plurality of reference signals (RSs) via one or more receive beams, wherein each of the one or more receive beams is characterized by one of a plurality of codebook beam directions

704 estimate a first non-codebook beam direction of a transmit beam of the wireless node based on a measurement of one or more RSs of the plurality of RSs

706 output a report comprising an indication of the first non-codebook beam direction for transmission to the wireless node

708 obtain, in response to the report, an indication of a custom beam direction of the transmit beam

710 estimate a second non-codebook beam direction for obtaining signaling transmitted via the custom beam direction

712 obtain signaling via a receive beam of the one or more receive beams, wherein a direction associated with the receive beam is defined by the second non-codebook direction

802 obtain assistance information comprising an indication of the plurality of codebook beam directions, wherein the first non-codebook beam direction is further based on the assistance information

902 estimate a second non-codebook beam direction of the transmit beam based on the measurement of one or more RSs, wherein the report further comprises an indication of the second non-codebook beam direction

1000

1002 estimate a first strength of the first non-codebook beam direction

1004 estimate a second strength of the second non-codebook beam direction

1006 estimate a first coefficient and a second coefficient based on the first strength and the second strength

Figure 11:
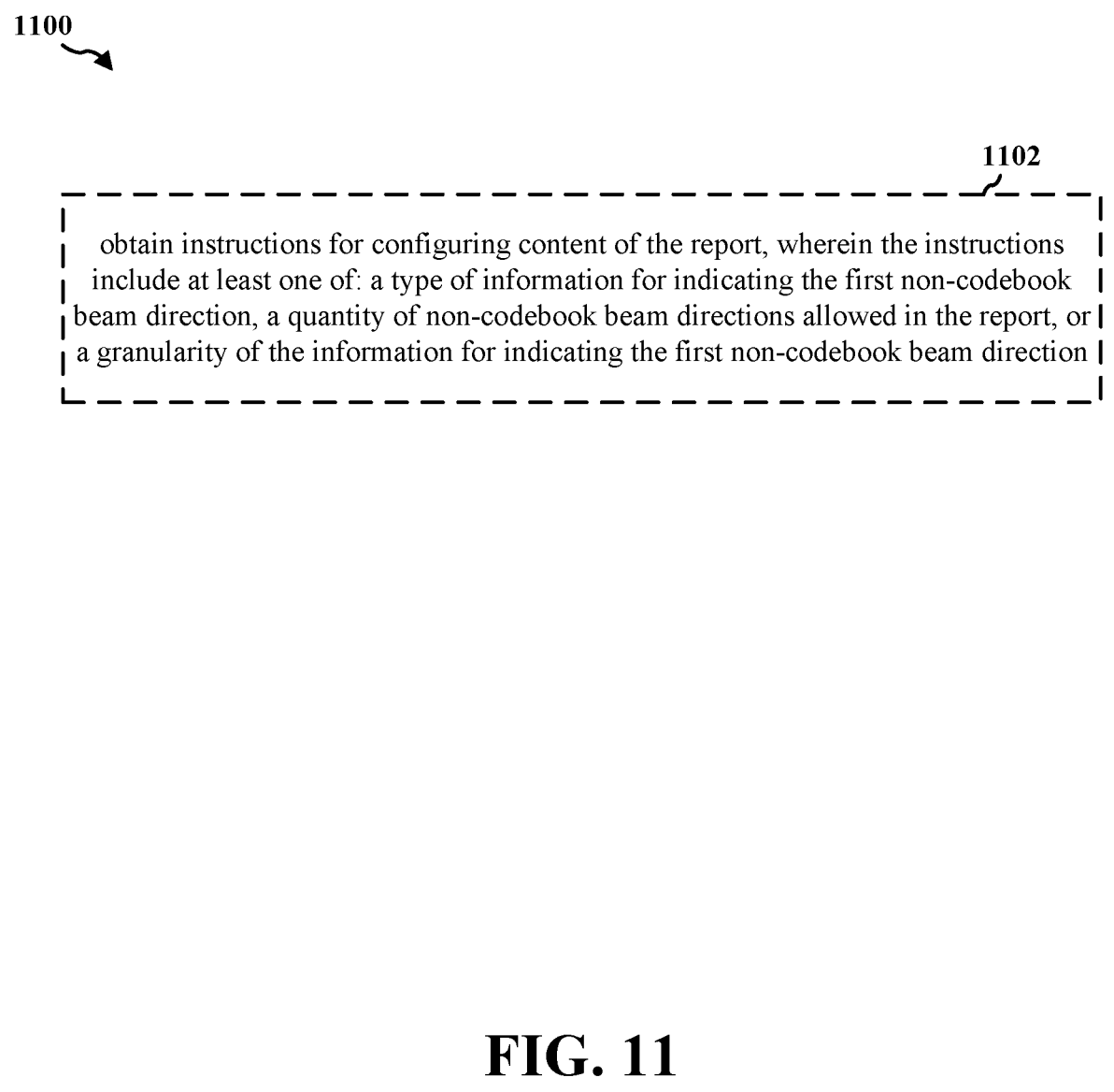

1100

1102 obtain instructions for configuring content of the report, wherein the instructions include at least one of: a type of information for indicating the first non-codebook beam direction, a quantity of non-codebook beam directions allowed in the report, or a granularity of the information for indicating the first non-codebook beam direction

1302 output assistance information for transmission to the wireless node, the assistance information comprising an indication of the plurality of codebook beam directions

1304 output instructions for transmission to the wireless node, the instructions for configuring content of the report, wherein the instructions include at least one of: a type of information for indicating the first non-codebook beam direction, a quantity of non-codebook beam directions allowed in the report, or a granularity of the information for indicating the first non-codebook beam direction

1308 output, to a wireless node, a plurality of reference signals (RSs) for transmission via one or more transmit beams, wherein each of the one or more transmit beams is characterized by one of a plurality of codebook beam directions

1310 obtain, from the wireless node, a report comprising an indication of a first non-codebook beam direction for a transmit beam of the apparatus, the first non-codebook beam direction based on the one or more RSs of the plurality of RSs

1312 estimate a custom beam direction of the transmit beam based on the report

1314 output, for transmission an indication of a custom beam direction of the transmit beam after obtaining the report

1316 output, for transmission via the transmit beam characterized by the custom beam direction, signaling to the wireless node

FIG. 13

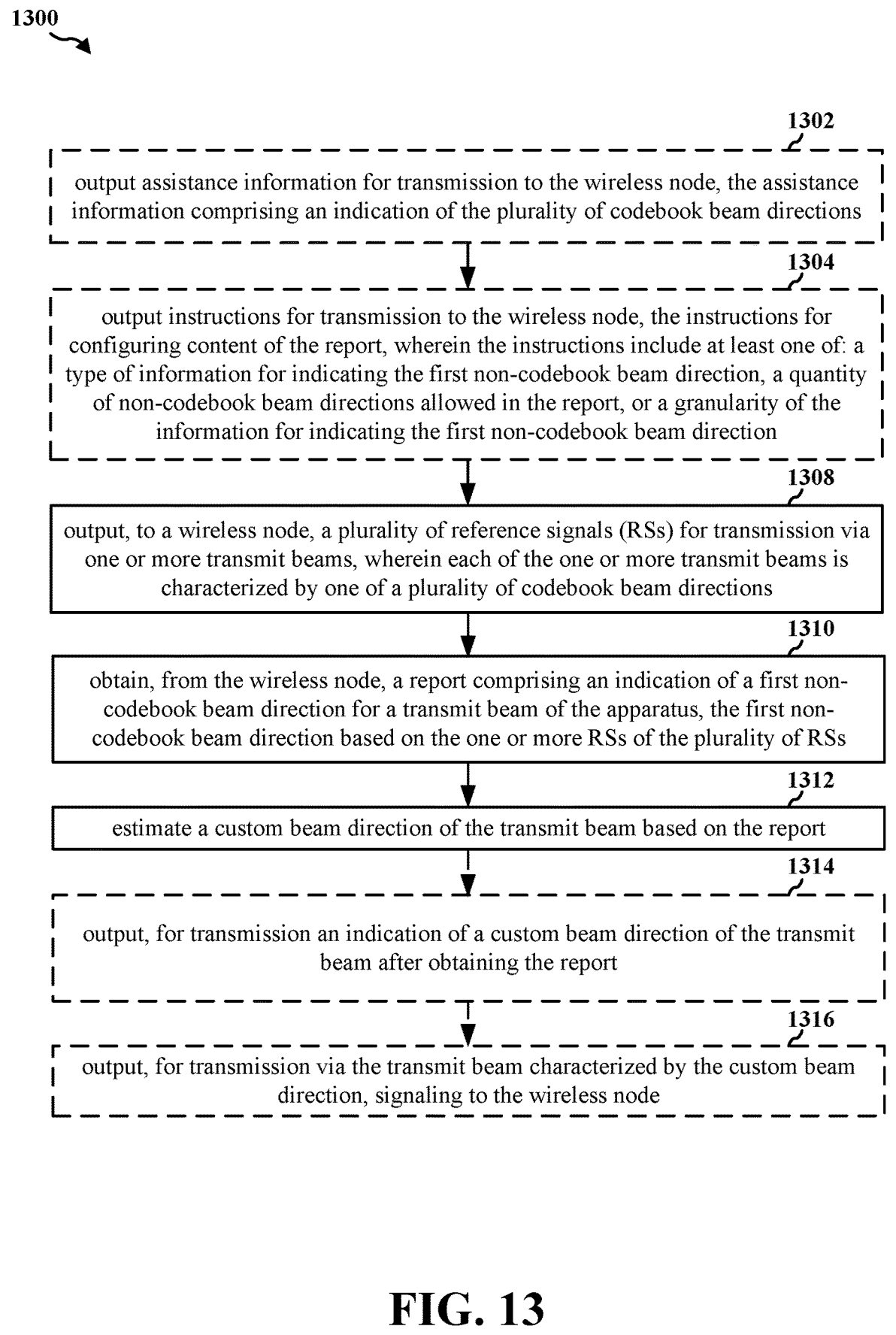

NETWORK-ASSISTED BEAMFORMING

BACKGROUND

Technical Field

The present disclosure generally relates to communication systems, and more particularly, to network-assisted beamforming between wireless nodes.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Certain aspects are directed to an apparatus configured for wireless communication. In some examples, the apparatus includes a memory comprising instructions and one or more processors configured to execute the instructions. In some examples, the one or more processors are configured to obtain, from a wireless node, a plurality of reference signals (RSS) via one or more receive beams, wherein each of the one or more receive beams is characterized by one of a plurality of codebook beam directions. In some examples, the one or more processors are configured to estimate a first non-codebook beam direction of a transmit beam of the wireless node based on a measurement of one or more RSs of the plurality of RSs. In some examples, the one or more processors are configured to output a report comprising an indication of the first non-codebook beam direction for transmission to the wireless node.

Certain aspects are directed to a method for wireless communication at an apparatus. In some examples, the method includes obtaining, from a wireless node, a plurality of reference signals (RSs) via one or more receive beams, wherein each of the one or more receive beams is characterized by one of a plurality of codebook beam directions. In some examples, the method includes estimating a first non-codebook beam direction of a transmit beam of the wireless node based on a measurement of one or more RSs of the plurality of RSs. In some examples, the method includes outputting a report comprising an indication of the first non-codebook beam direction for transmission to the wireless node.

Certain aspects are directed to an apparatus configured for wireless communication. In some examples, the apparatus includes means for obtaining, from a wireless node, a plurality of reference signals (RSS) via one or more receive beams, wherein each of the one or more receive beams is characterized by one of a plurality of codebook beam directions. In some examples, the apparatus includes means for estimating a first non-codebook beam direction of a transmit beam of the wireless node based on a measurement of one or more RSs of the plurality of RSs. In some examples, the apparatus includes means for outputting a report comprising an indication of the first non-codebook beam direction for transmission to the wireless node.

Certain aspects are directed to a non-transitory computer-readable medium having instructions stored thereon that, when executed by an apparatus, cause the apparatus to perform operations. In some examples, the operations include obtaining, from a wireless node, a plurality of reference signals (RSs) via one or more receive beams, wherein each of the one or more receive beams is characterized by one of a plurality of codebook beam directions. In some examples, the operations include estimating a first non-codebook beam direction of a transmit beam of the wireless node based on a measurement of one or more RSs of the plurality of RSs. In some examples, the operations include outputting a report comprising an indication of the first non-codebook beam direction for transmission to the wireless node.

Certain aspects are directed to an apparatus configured for wireless communication. In some examples, the apparatus includes a memory comprising instructions and one or more processors configured to execute the instructions. In some examples, the one or more processors are configured to output, to a wireless node, a plurality of reference signals (RSs) for transmission via one or more transmit beams, wherein each of the one or more transmit beams is characterized by one of a plurality of codebook beam directions. In some examples, the one or more processors are configured to obtain, from the wireless node, a report comprising an indication of a first non-codebook beam direction for a transmit beam of the apparatus, the first non-codebook beam direction based on the one or more RSs of the plurality of RSs. In some examples, the one or more processors are configured to estimate a custom beam direction of the transmit beam based on the report.

Certain aspects are directed to a method for wireless communication at an apparatus. In some examples, the method includes outputting, to a wireless node, a plurality of reference signals (RSs) for transmission via one or more transmit beams, wherein each of the one or more transmit beams is characterized by one of a plurality of codebook beam directions. In some examples, the method includes obtaining, from the wireless node, a report comprising an indication of a first non-codebook beam direction for a transmit beam of the apparatus, the first non-codebook beam direction based on the one or more RSs of the plurality of RSs. In some examples, the method includes estimating a custom beam direction of the transmit beam based on the report.

Certain aspects are directed to an apparatus configured for wireless communication. In some examples, the apparatus includes means for outputting, to a wireless node, a plurality of reference signals (RSs) for transmission via one or more transmit beams, wherein each of the one or more transmit beams is characterized by one of a plurality of codebook beam directions. In some examples, the apparatus includes means for obtaining, from the wireless node, a report comprising an indication of a first non-codebook beam direction for a transmit beam of the apparatus, the first non-codebook beam direction based on the one or more RSs of the plurality of RSs. In some examples, the apparatus includes means for estimating a custom beam direction of the transmit beam based on the report.

Certain aspects are directed to a non-transitory computer-readable medium having instructions stored thereon that, when executed by an apparatus, cause the apparatus to perform operations. In some examples, the operations include outputting, to a wireless node, a plurality of reference signals (RSs) for transmission via one or more transmit beams, wherein each of the one or more transmit beams is characterized by one of a plurality of codebook beam directions. In some examples, the operations include obtaining, from the wireless node, a report comprising an indication of a first non-codebook beam direction for a transmit beam of the apparatus, the first non-codebook beam direction based on the one or more RSs of the plurality of RSs. In some examples, the operations include means for estimating a custom beam direction of the transmit beam based on the report.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 7 is a flowchart of a method of wireless communication.

FIG. 8 is a flowchart of a method of wireless communication.

FIG. 11 is a flowchart of a method of wireless communication.

FIG. 13 is a flowchart of a method of wireless communication.

DETAILED DESCRIPTION

Figure 1:
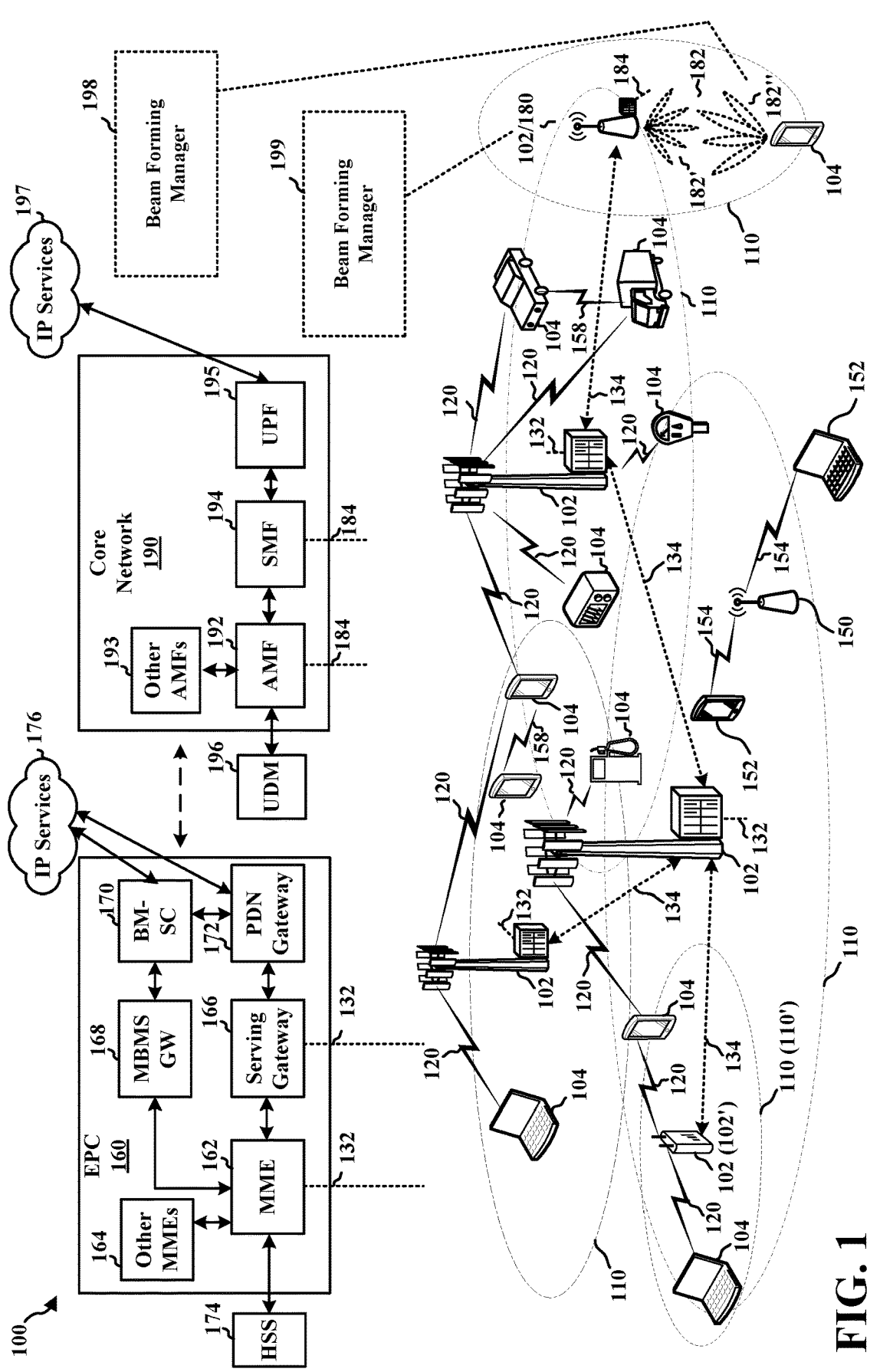
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Certain aspects of the disclosure relate to network-assisted beamforming between wireless nodes. In one example, the beamforming may be performed between a user equipment (UE) and a network entity (e.g., a base station or a node of a disaggregated base station, such as a radio unit (RU), a central units (CU), a distributed unit (DU), etc.).

Some beamforming processes may use a codebook approach, wherein after beam measurement, the network entity may identify a codebook transmit beam to the UE, and the UE may adjust its receive beam based on the identified codebook beam. Here, the UE and the network entity may share the same codebook(s) so that the identification is coherent. However, codebook beam directions are limited to the preconfigured directions of the codebook. As such, the codebook approach to communication may not allow the UE and network entity to use beam directions that are not part of the codebook. Thus, while the UE and network entity may use the optimal codebook beam direction, a different beam direction may provide better spectral efficiency (e.g., improved reliability, reduced latency, etc.). Accordingly, aspects of the disclosure are directed to techniques that may allow wireless communication devices to maximize spectral efficiency by identifying and using beam directions that may not be part of a codebook.

For example, a network entity may initiate a beamforming or beam management process by transmitting assistance information to a UE. The assistance information may include information relating to beam directions, for example a codebook of beam direction. The assistance information may include boresight directions for multiple beams of a codebook, such as an elevation and an azimuth for multiple beam directions, or any other suitable information that the UE may use as a basis for deriving an analog beam forming matrix for a communication channel used by the network entity and UE.

The network entity may also transmit report information to the UE. The report information may configure the UE to provide particular information to the network via a report generated by the UE. For example, the report information may configure the UE to transmit a report that includes beam direction information for a certain number of beam directions. The report information may also configure UE's report such that the report includes particular beam direction information (e.g., angle of departure (AoD)) and/or a granularity of the information.

The network entity may then transmit downlink reference signals (RSs) to the UE using one or more transmit beams having the same beam directions as those indicated in the assistance information. The UE may receive the RSs and measure them using codebook receive beam directions. Through the measurements, the UE may determine which codebook beams provide the strongest reception of the RSs. The UE may also compute, based on the measurements, one or more beam directions independent of the codebook beams that may provide better reception than determined codebook beams. For example, the UE may use an iterative computation and/or an artificial intelligence (AI)/machine learning (ML) algorithm to estimate an AoD and an angle of arrival (AoA) for a custom (non-codebook) transmit beam.

The UE may compute multiple AoDs and AoAs for a single beam. For example, if the UE computes two custom beam directions estimated to have strong reference signal received power (RSRP) or gain, the network entity may use a multi-lobe beam that has at least two main lobes directed based on two AoDs. Here, if the UE provides the network entity with multiple AoDs, the UE may also determine a coefficient for each estimated custom beam direction, wherein the coefficient is configured to indicate which direction should be given the most weight. Thus, the coefficients may be a function of the difference of relative strength of each custom beam relative to the others. In some examples, the network entity may use a single-lobe beam for only the strongest estimated beam direction.

The UE may then transmit a report that includes information about the custom beams to the network entity. The report may be configured according to the report information provided by the network entity. In some examples, the report may include at least one AoD of a custom beam direction estimated by the UE and a corresponding coefficient.

The network entity may then generate one or more custom transmit beams based on the UE report, and provide the UE with an indication of a custom transmission configuration indicator (TCI) configured to provide the UE with information (e.g., direction) regarding the one or more custom transmit beams. Based on the custom TCI, the UE may determine to adjust one or more of its receive beams based on the custom TCI configuration and/or the previously estimated AoA.

Accordingly, the UE and network entity may use beams directions that are independent of a codebook and provide a higher degree of spectral efficiency relative to a codebook beam direction. Moreover, dynamic codebook adaptation as described herein may improve communications between wireless nodes by providing the nodes with additional resources.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, user equipment(s) (UE) 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G Long Term Evolution (LTE) (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G New Radio (NR) (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, Multimedia Broadcast Multicast Service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHZ, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). The frequencies between FR1 and FR2 are often referred to as mid-band frequencies. Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHZ spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182''. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, an MBMS Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides Quality of Service (QOS) flow and session management. All user IP packets are transferred through the UPF 195. The UPF 195 provides UE IP address allocation as well as other functions. The UPF 195 is connected to the IP Services 197. The IP Services 197 may include the Internet, an intranet, an IMS, a Packet Switch (PS) Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A wireless node may comprise a UE, a base station, or a network entity.

Referring again to FIG. 1, the UE 104 may include a first beam forming manager 198. As described in more detail elsewhere herein, the first beamforming manager 198 may be configured to obtain, from a wireless node, a plurality of reference signals (RSs) via one or more receive beams, wherein each of the one or more receive beams is characterized by one of a plurality of codebook beam directions. The first beamforming manager 198 may also be configured to estimate a first non-codebook beam direction of a transmit beam of the wireless node based on a measurement of one or more RSs of the plurality of RSs. The first beamforming manager 198 may also be configured to output a report comprising an indication of the first non-codebook beam direction for transmission to the wireless node. Additionally, or alternatively, the first beamforming manager 198 may perform one or more other operations described herein.

The base station 102/180 may include a second beamforming manager 199. As described in more detail elsewhere herein, the second beamforming manager 199 may be configured to output, to a wireless node, a plurality of reference signals (RSs) for transmission via one or more transmit beams, wherein each of the one or more transmit beams is characterized by one of a plurality of codebook beam directions. In certain aspects, the second beamforming manager 199 may be configured to obtain, from the wireless node, a report comprising an indication of a first non-codebook beam direction for a transmit beam of the apparatus, the first non-codebook beam direction based on the one or more RSs of the plurality of RSs. In certain aspects, the second beamforming manager 199 may be configured to estimate a custom beam direction of the transmit beam based on the report. Additionally, or alternatively, the second beamforming manager 199 may perform one or more other operations described herein.

Figures 2A, 2B, 2C, 2D:
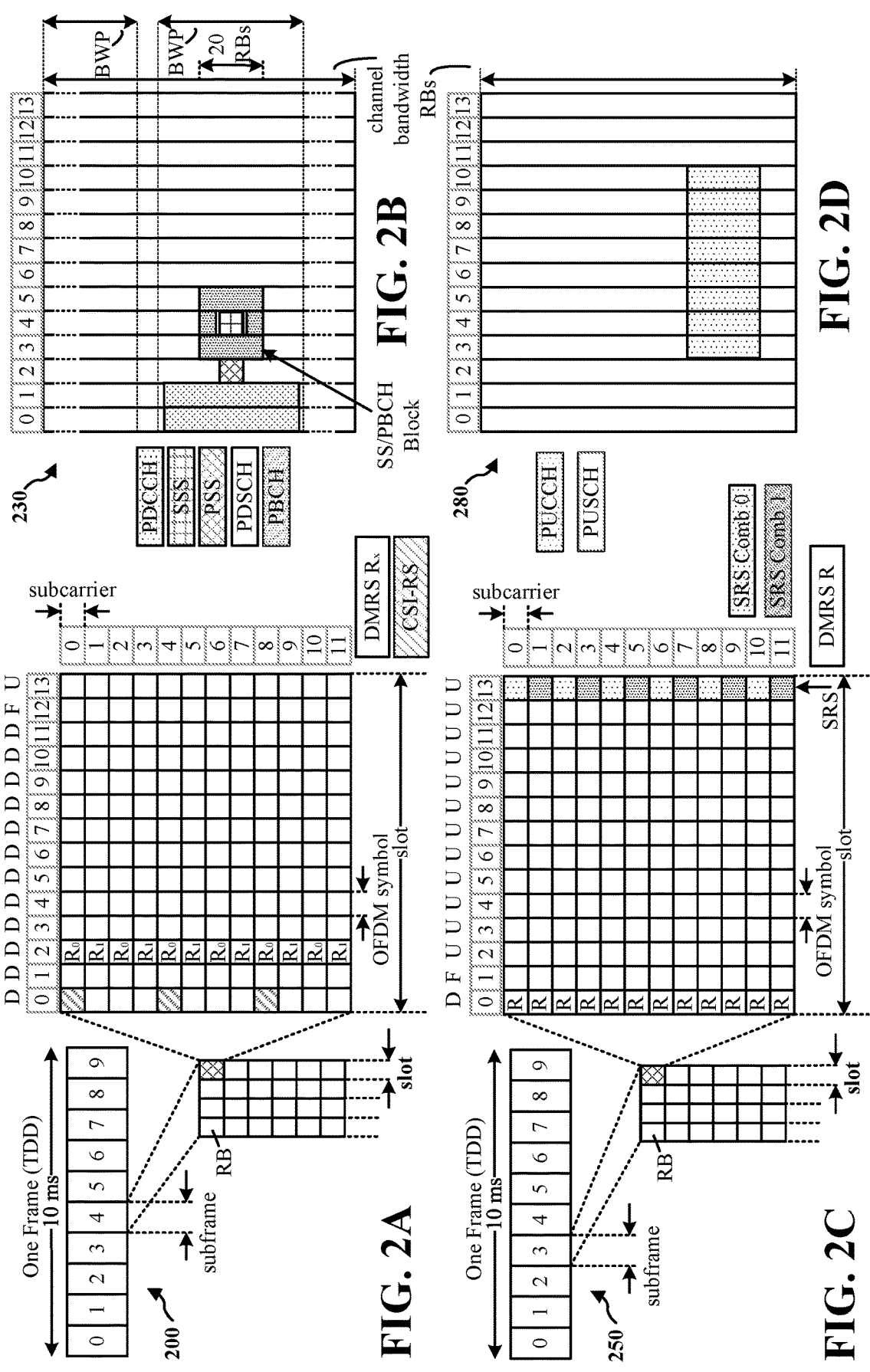
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame, e.g., of 10 milliseconds (ms), may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency-division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and 24 slots/subframe. The subcarrier spacing and symbol length/duration are a function of the numerology. The subcarrier spacing may be equal to $2^{\mu}*15$ kilohertz (kHz), where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where $100x$ is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A PDCCH within one BWP may be referred to as a control resource set (CORESET). Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgement (ACK)/non-acknowledgement (NACK) feedback. The PUSCH carries data, and may additionally be used to carry a buffer status report (BSR), a power headroom report (PHR), and/or UCI.

Figure 3:
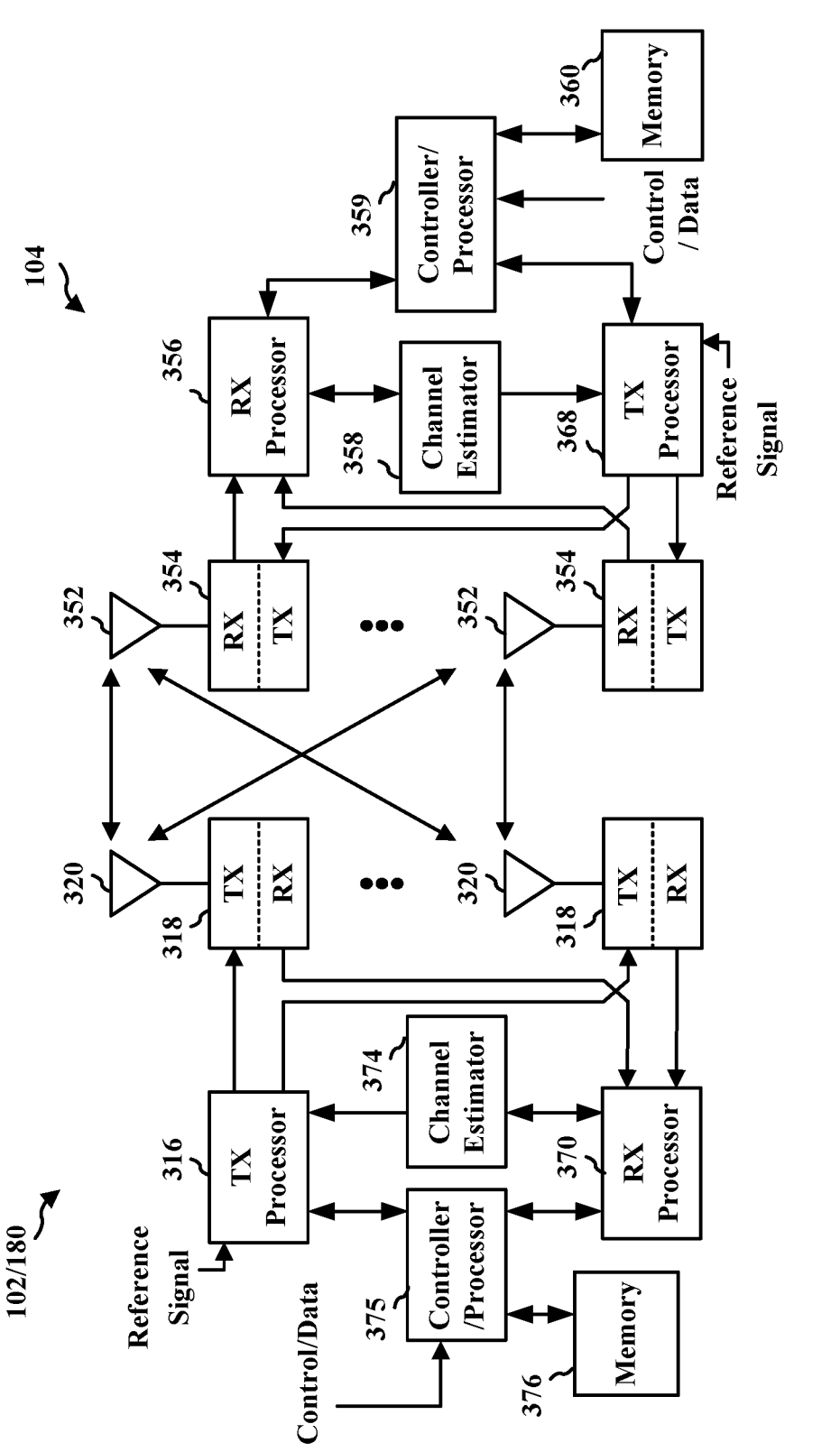
FIG. 3 is a diagram illustrating an example of a base station and user equipment (UE) in an access network.

FIG. 3 is a block diagram of a base station 102/180 in communication with a UE 104 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 104. Each spatial stream may then be provided to a different antenna 320 via a separate transmitter 318TX. Each transmitter 318TX may modulate an RF carrier with a respective spatial stream for transmission.

At the UE 104, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 104. If multiple spatial streams are destined for the UE 104, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 102/180. These soft decisions may be based on channel estimates computed by the channel estimator 358. The soft decisions are then decoded and deinterleaved to recover the data and control signals that were originally transmitted by the base station 102/180 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 102/180, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 102/180 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 102/180 in a manner similar to that described in connection with the receiver function at the UE 104. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 104. IP packets from the controller/processor 375 may be provided to the EPC 160. The controller/processor 375 is also responsible for error detection using an ACK and/or NACK protocol to support HARQ operations.

Figure 4:
FIG. 4 is a block diagram illustrating an example disaggregated base station architecture.

FIG. 4 is a block diagram illustrating an example disaggregated base station 400 architecture. The disaggregated base station 400 architecture may include one or more CUs 410 that can communicate directly with a core network 420 via a backhaul link, or indirectly with the core network 420 through one or more disaggregated base station units (such as a near real-time (RT) RIC 425 via an E2 link, or a non-RT RIC 415 associated with a service management and orchestration (SMO) Framework 405, or both). A CU 410 may communicate with one or more DUs 430 via respective midhaul links, such as an F1 interface. The DUs 430 may communicate with one or more RUs 440 via respective fronthaul links. The RUs 440 may communicate with respective UEs 104 via one or more radio frequency (RF) access links. In some implementations, the UE 104 may be simultaneously served by multiple RUs 440. As used herein, a network entity may correspond to a base station or to a disaggregated aspect (e.g., CU/DU/RU, etc.) of the base station.

Each of the units, i.e., the CUS 410, the DUs 430, the RUs 440, as well as the near-RT RICs 425, the non-RT RICs 415 and the SMO framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., central unit-user plane (CU-UP)), control plane functionality (i.e., central unit-control plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 104. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a virtual RAN (vRAN) architecture.

The SMO Framework 405 may be configured to support RAN deployment and provisioning of non-virtualized and virtualized network elements. For non-virtualized network elements, the SMO framework 405 may be configured to support the deployment of dedicated physical resources for RAN coverage requirements, which may be managed via an operations and maintenance interface (such as an O1 interface). For virtualized network elements, the SMO framework 405 may be configured to interact with a cloud computing platform (such as an open cloud (O-cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and near-RT RICs 425. In some implementations, the SMO framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO framework 405 also may include the non-RT RIC 415 configured to support functionality of the SMO Framework 405.

The non-RT RIC 415 may be configured to include a logical function that enables non-real-time control and optimization of RAN elements and resources, artificial intelligence/machine learning (AI/ML) workflows including model training and updates, or policy-based guidance of applications/features in the near-RT RIC 425. The non-RT RIC 415 may be coupled to or communicate with (such as via an AI interface) the near-RT RIC 425. The near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the near-RT RIC 425.

In some implementations, to generate AI/ML models to be deployed in the near-RT RIC 425, the non-RT RIC 415 may receive parameters or external enrichment information from external servers. Such information may be utilized by the near-RT RIC 425 and may be received at the SMO Framework 405 or the non-RT RIC 415 from non-network data sources or from network functions. In some examples, the non-RT RIC 415 or the near-RT RIC 425 may be configured to tune RAN behavior or performance. For example, the non-RT RIC 415 may monitor long-term trends and patterns for performance and employ AI/ML models to perform corrective actions through the SMO Framework 405 (such as reconfiguration via 01) or via creation of RAN management policies (such as A1 policies).

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

Examples of Network-Assisted Beamforming Using Non-Codebook Beams

As discussed, beamforming may be performed between a user equipment (UE) and a network entity, and such beamforming or beam management may be performed based on codebooks used by both the UE and network entity. In such an example, the codebook provides the UE and network entity with a number of fixed beam directions. However, an optimal beam (e.g., a beam direction that provides a higher SINR/RSRP relative to other beam directions) may be a non-codebook beam, or a beam direction that is not included in the codebook. Moreover, although codebooks may provide a plurality of different beam directions, their static nature may not allow the UE and/or network entity to use beam directions that are not part of the codebook. Accordingly, aspects of the disclosure are directed to techniques that may allow wireless communication devices to maximize spectral efficiency by identifying and using beam directions that may not be part of a codebook.

Figure 5:
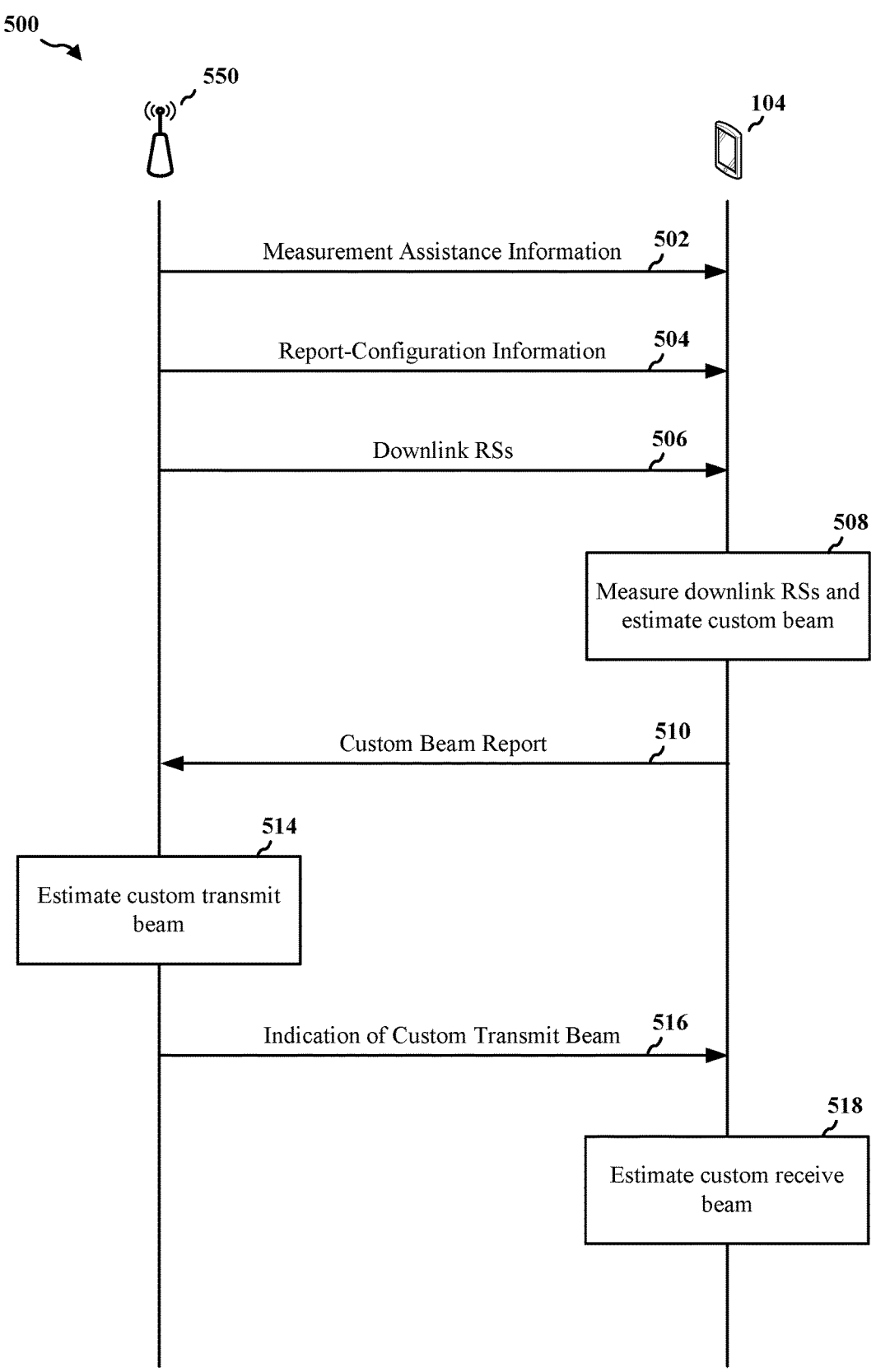
FIG. 5 is a call-flow diagram illustrating example communications between a UE and a network entity.

FIG. 5 is a call-flow diagram illustrating example communications 500 between a UE 104 (e.g., UE 104 of FIG. 1) and a network entity 550 (e.g., base station 102/180 of FIG. 1; RU 440, DU 430, or CU 410 of FIG. 4). It should be noted that the communications described may be performed by any wireless nodes with beam management capabilities.

At a first communication 502, the network entity 550 may transmit measurement assistance information. Here, the network entity 550 may transmit any suitable information that the UE 104 can use to determine a beam direction of a transmit beam used by the network entity 550. For example, the information may include a basis for computing an array response for codebook transmit beams used by the network entity 550 for transmitting signaling to the UE 104. In one example, the network entity 550 may provide the UE 104 with a boresight direction of one or more transmit beams used by the network entity 550 for transmitting signaling to the UE 104. More specifically, the network entity 550 may transmit an indication of one or more beam directions that the network entity 550 uses to transmit signaling, wherein the directions are codebook beam directions. The measurement assistance information may provide the UE 104 with information indicative of a location vector (e.g., spherical unit vector with azimuth departure angle (AoD) and/or elevation departure angle (e.g., zenith of departure (ZoD)) of a transmit antenna element of the network entity 550.

In a second communication 504, the network entity 550 may transmit report-configuration information to the UE 104. This information may include instructions for configuring the UE 104 to transmit a report containing specific data to the network entity 550. For example, the information may cause the UE 104 to transmit a report that includes a type of information, such as an AoD, ZoD, and/or a coefficient associated with a non-codebook beam. The UE 104 may be configured to estimate the AoD and associated coefficient of the non-codebook beam as described in more detail below. In some examples, the information may cause the UE 104 to transmit a report that includes a quantity of non-codebook beam directions that are allowed in the report. Here, the network entity 550 may limit a number of non-codebook beam directions for which the UE 104 may provide information in the report. In one example, the transmit report-configuration information may limit the UE 104 to including information associated with an explicit number of non-codebook beams. Here, even if the UE 104 estimates five possible non-codebook beam directions of a network entity 550, the report-configuration information may instruct the UE 104 to provide information for the two (or any suitable number) most dominant beam directions (e.g., network entity 550 transmit beam directions estimated to highest RSRP and/or SINR).

In another example, the report-configuration information may provide an implicit limitation of beam direction information the UE 104 may include in a report. For example, the report-configuration information may instruct the UE 104 to provide information for a number of beam directions as a function of a beam direction estimated to have a highest RSRP and/or SINR. Here, if the RSRP of the strongest beam direction is estimated to be x, the report-configuration information may instruct the UE 104 to provide information for any number of estimated beam directions that have an estimated power greater than x/2. Thus, a number of estimated transmit beam directions included in the report may vary relative to other report.

In another example, the report-configuration information may provide the UE 104 with an indication of a granularity of data the UE 104 includes in the report. For example, the report-configuration information may indicate an accuracy of measurements and/or estimations computed by the UE 104 (e.g., a number of decimal places) that the network entity 550 expects for one or more types of information included in a report.

In a third communication 506, the network entity 550 may transmit a plurality of reference signal (RSs) via one or more transmit beams (e.g., transmit beams indicated to the UE 104 via the measurement assistance information of the first communication 502). The UE 104 may receive one or more of the plurality of RSs via one or more receive beams. In some examples, the third communication 506 may be performed as part of a beam management function. For example, the network entity 550 may sweep through a plurality of transmit beams each having a direction defined by a codebook, wherein a unique RS is transmitted on each of the plurality of transmit beams. The network entity 550 may perform the same sweep for each of multiple receive beams (e.g., codebook receive beams) used by the UE 104 to measure the transmitted RSs.

At a first process 508, the UE 104 may support beam management by measuring the transmitted RSs and estimating one or more optimal non-codebook (e.g., custom) transmit beams based on the RS measurements. In example, the UE may estimate one or more of an AoD, an angle of arrival (AoA), a ZoD, a zenith of arrival (ZoA), an RSRP, and/or a SINR for a non-codebook transmit beam at the network entity 550. In some examples, the UE 104 may use channel impulse response (CIR) to model codebook beam pairs measured during beam management. Based on a CIR of multiple beam pairs, the UE 104 may estimate non-codebook beams using an orthogonal matching pursuit (OMP) algorithm.

The OMP algorithm may be executed in multiple iterations per tap (e.g., a tapped delay line (TDL)) and may leverage a sparsity of one or more channels in the tap domain. For each tap, the UE 104 may estimate one or more of a one or more of an AoA/AoD/ZoA/ZoD of a non-codebook transmit beam in each iteration of the OMP algorithm. Through the iterative process, the identified angles may be subtracted from an observation vector (e.g., a vector of a codebook transmit beam used for beam management). In some examples, the UE 104 may estimate a beam power (e.g., RSRP) and/or a beam quality (e.g., SINR) of a non-codebook transmit beam based on measurements of the RSs received via the codebook transmit beams used in the third communication 506.

Figure 6:
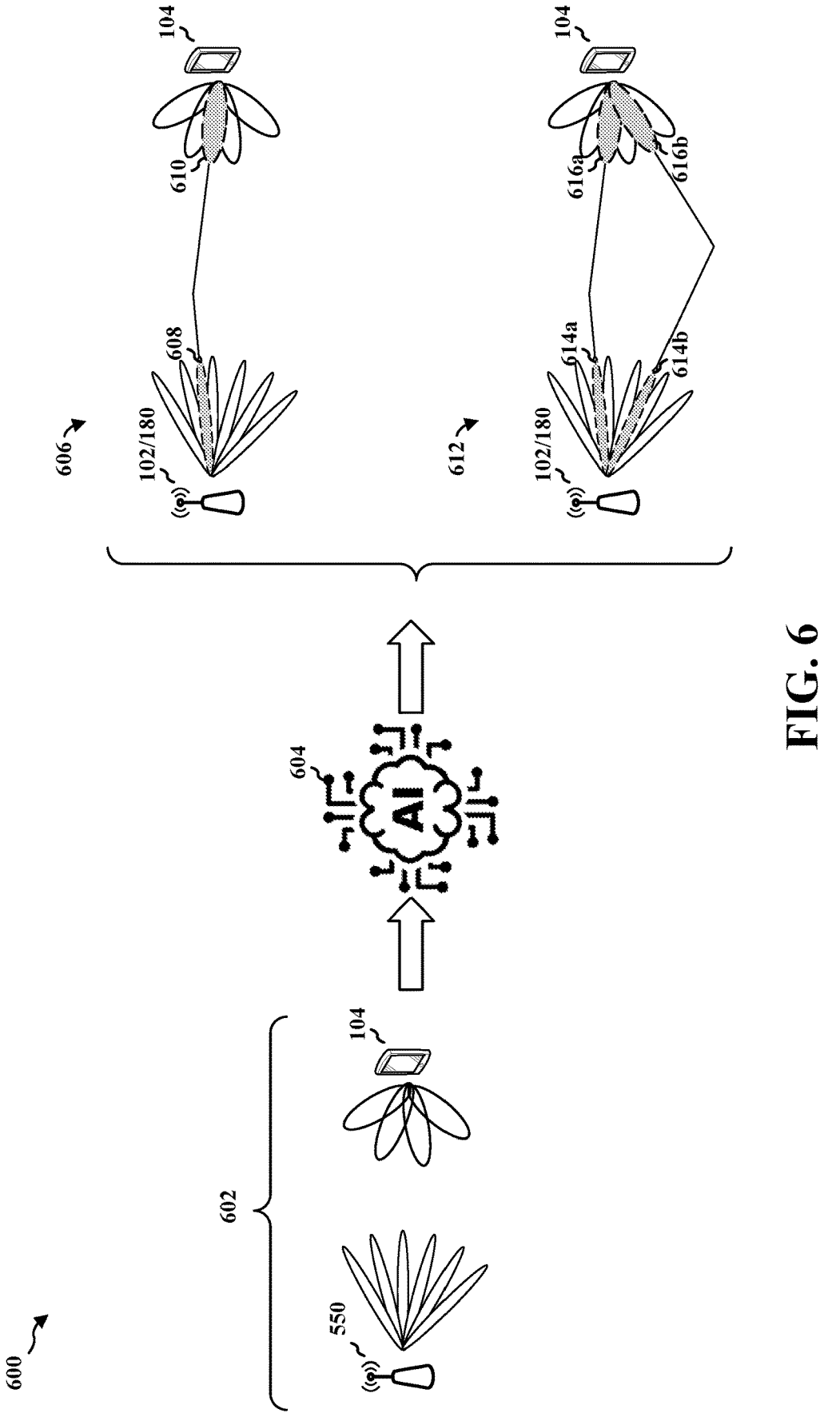
FIG. 6 is a schematic diagram conceptually illustrating an example of estimating one or more non-codebook beam directions.

For example, FIG. 6 is a schematic diagram conceptually illustrating an example of estimating one or more non-codebook beam directions 600. Here, the UE 104 may compute a $d^{th}$ tap of CIR for each beam pair used in a beam management process 602. As illustrated, the network entity 550 may sweep through six transmit beams, transmitting an RS signal on each transmit beam, and the UE 104 may use one of the four receive beams to receive the transmitted RSs per sweep. The UE 104 may determine a beam pair having a highest RSRP for each of the four receive beams, and input the multiple beam pairs into the OMP algorithm 604 to compute one or more of AoA/AoD/ZoA/ZoD of non-codebook beam(s). The OMP algorithm 604 may be computed using machine learning (ML) and/or artificial intelligence (AI) computing. In some examples, the UE 104 may estimate a non-codebook beam pair having a single-lobe 606 direction of a custom transmit beam 608 (e.g., AoD) and a single lobe direction of a corresponding custom receive beam 610 (e.g., AoA). In another example, the UE 104 may estimate a non-codebook beam pair comprising beams having two main lobes 612. Here, a custom transmit beam may include a first transmit lobe 614*a* and a second transmit lobe 614*b*, and a custom receive beam may include a first receive lobe 616*a* and a second receive lobe 616*b*.

At a fourth communication 510, the UE 104 may transmit a beam report generated based on the first process 508. Here, the report may include the information that the UE 104 was instructed to include, according to the report-configuration information of the second communication 504. In some examples, the UE 104 may generate a report that includes an indication of an estimated AoD of a non-codebook transmit beam. In another example, the report may include multiple AoD indications, wherein each AoD corresponds to one of multiple non-codebook transmit beams and/or one of multiple lobes of a single non-codebook transmit beam.

In some examples, the UE 104 may include an indication of a coefficient associated with one or more AoDs. For example, a report may include an indication of a first AoD and an indication of a second AoD of a custom transmit beam. If the UE 104 estimates that a direction associated with the first AoD is stronger than a direction associated with the second AoD, the UE may include a coefficient associated with one or both of the first and second AoDs in the report. The coefficients may be a function of a difference of estimated signal strength of the first AoD relative to the second AoD. For example, if the UE 104 estimates a single transmit beam having two main lobes defined by the first AoD and the second AoD, and the first AoD is estimated to have a stronger path relative to the second AoD, a first coefficient ($\alpha_1$) associated with the first AoD and a second coefficient ($\alpha_2$) associated with the second AoD may be provided to indicate the difference and degree of strength difference. In another example, if the first AoD is associated with a first custom transmit beam, and the second AoD is associated with a second custom transmit beam, the coefficients may be configured to indicate which transmit beam is weaker and the network entity 550 may compensate that beam with a higher transmit power.

In some examples, the network entity 550 may configured the UE 104 to normalize the coefficient values provided in the report. For example, the UE 104 may calculate the coefficient values such that ($\alpha_1+\alpha_{2=1}$).

At a second process 514, the network entity may estimate a custom transmit beam based on the report received in the fourth communication 510. For example, the network entity 550 may determine an actual AoD for a non-codebook transmit beam based on an AoD included in the report. As noted, the network entity may be capable of generating an actual AoD equal to the reported AoD, but hardware constraints at the network entity 550 may affect how close the network entity's 550 custom beam is to the reported AoD.

As such, the network entity may determine an actual AoD that is as close to the reported AoD as the network entity's 550 hardware allows.

At a fifth communication 516, the network entity 550 may transmit an indication (e.g., a custom transmission configuration index (TCI)) of a non-codebook transmit beam determined based on the report. The indication may include an actual AoD for a non-codebook beam direction. The UE may receive the indication of the custom beam direction of the transmit beam of the network entity after outputting the report for transmission.

At a third process 518, the UE may estimate a second non-codebook beam direction for obtaining signaling transmitted via the custom beam direction. Here, the UE 104 may update a direction of one or more of its codebook receive beams based on the custom TCI received from the network entity 550 to get maximum spectral efficiency out of the channel. If the custom TCI is a combination of directions, the UE 104 may generate its non-codebook receive beam by computing a linear combination based on the custom TCI from the network entity 550 and the coefficients determined by the UE 104. In some examples, the UE 104 may generate its non-codebook receive beams based on a corresponding AoA determined at the first process 508. If the actual AoD is different from the AoD provided in the report, then the UE 104 may use the previously computed AoA and/or the measurement assistance information received at the first communication 502 to determine an actual AoA for the non-codebook receive beam. The UE 104 and the network entity 550 may then communicate using the non-codebook directional beam pair(s). For example, the UE 104 may receive signaling via a receive beam of one or more receive beams, wherein a direction associated with the receive beam is defined by the generated non-codebook receive beam.

FIG. 7 is a flowchart 700 of a method of wireless communication. The method may be performed by a UE (e.g., the UE 104; the apparatus 1202). At 702, the UE may obtain, from a wireless node, a plurality of reference signals (RSs) via one or more receive beams, wherein each of the one or more receive beams is characterized by one of a plurality of codebook beam directions, as shown in the third communication 506 of FIG. 5. For example, 702 may be performed by an obtaining component 1240. Here, a wireless node may transmit a plurality of RSs, with each RS corresponding to a beam of a plurality of transmit beams. In some examples, the network entity may transmit the plurality of RSs several times so that the UE may attempt to receive the RSs using multiple different receive beam directions. Thus, each time the network entity transmits the plurality of RSs using the plurality of transmit beams, the UE may iteratively cycle through multiple receive beams using one receive beam to receive the RSs at each iteration. The UE may be configured with a codebook that the UE uses to determine which receive beams to use. The codebook may provide a spatial parameter indicative of a direction of each receive beam.

At 704, the UE may estimate a first non-codebook beam direction of a transmit beam of the wireless node based on a measurement of one or more RSs of the plurality of RSs, as illustrated in the second process 514 of FIG. 5. For example, 704 may be performed by an estimating component 1242. Here, the UE may use orthogonal matching pursuit (OMP) for sparse recovery. In some examples, the OMP may be part of a machine learning (ML) or artificial intelligence (AI) algorithm or process. The UE may input information to the OMP corresponding to measurement of the transmitted RSs and beam pairs (e.g., a transmit beam of the wireless node and a corresponding receive beam of the UE) having a highest measured RSRP. The OMP may generate a non-codebook transmit beam direction that is estimated to provide an optimal gain and/or power received at the UE.

At 706, the UE may output a report comprising an indication of the first non-codebook beam direction for transmission to the wireless node, as illustrated in the fifth communication 516 of FIG. 5. For example, 706 may be performed by an outputting component 1244. Here, the UE may transmit signaling to the wireless node, wherein the signaling is configured to indicate the non-codebook beam direction to the wireless node.

Optionally, at 708, the UE may obtain, in response to the report, an indication of a custom beam direction of the transmit beam, as illustrated by the fifth communication 516 of FIG. 5. For example, 708 may be performed by the obtaining component 1240. Here, the network may determine a custom beam direction for its transmission beam based on the report. The custom beam direction may be the same as the first non-codebook beam direction, or it may a different beam direction based on the report. In the latter case, the network may select a best beam direction based on the report and the network's own capabilities (e.g., if the network cannot form a beam defined by the first non-codebook beam direction, it will calculate a beam it is capable of forming and as close to the first non-codebook beam direction as possible).

Optionally, at 710, the UE may estimate a second non-codebook beam direction for obtaining signaling transmitted via the custom beam direction, as illustrated by the third process 518 of FIG. 5. For example, 710 may be performed by an estimating component 1242. Here, the UE may estimate a receive beam direction that it may use to receive network transmissions made via the custom beam direction indicated by the network.

Optionally, at 712, the UE may obtain signaling via a receive beam of the one or more receive beams, wherein a direction associated with the receive beam is defined by the second non-codebook direction. For example, 712 may be performed by the obtaining component 1240. Here, the UE may utilize a receive beam having the second non-codebook direction to receive a transmission from the network via the custom beam direction.

Figure 8:
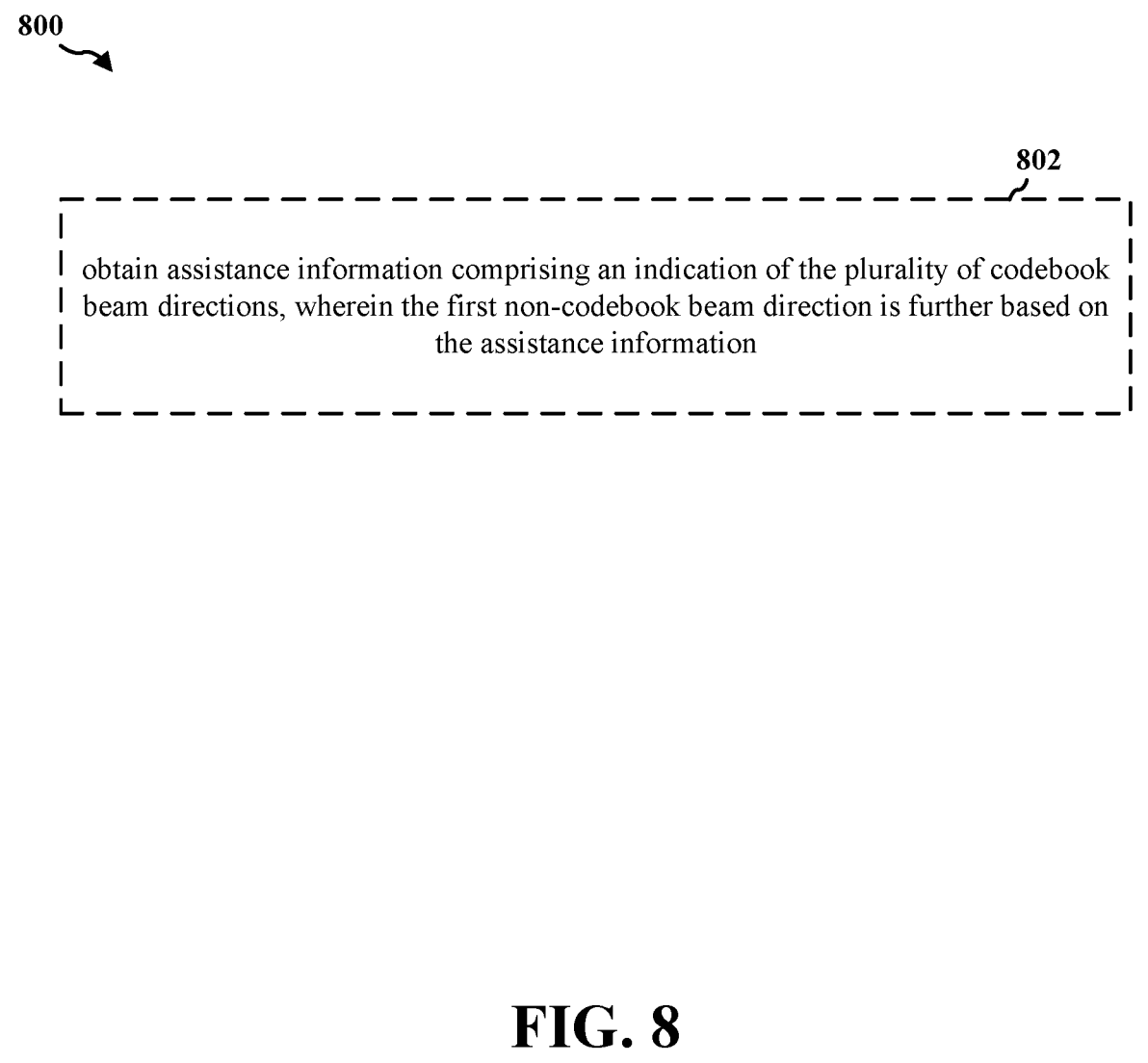

FIG. 8 is a flowchart 800 of a method of wireless communication. The method may be performed by a UE (e.g., the UE 104; the apparatus 1202). Block 802 is optional and may be used in conjunction with one or more of blocks illustrated in FIGS. 7-11. At 802, the UE may obtain assistance information comprising an indication of the plurality of codebook beam directions, wherein the first non-codebook beam direction is further based on the assistance information, as illustrated in the first communication 502 of FIG. 5. For example, 802 may be performed by the obtaining component 1240. Here, the UE may receive, from the wireless node, an indication of the codebook directions (e.g., transmit beam directions) that the UE may use to determine receive beam direction and transmit beam directions used at 702. The assistance information may include additional information, such as a location vector of transmit antenna s of the wireless node and/or an array response for the codebook beams.

Figure 9:
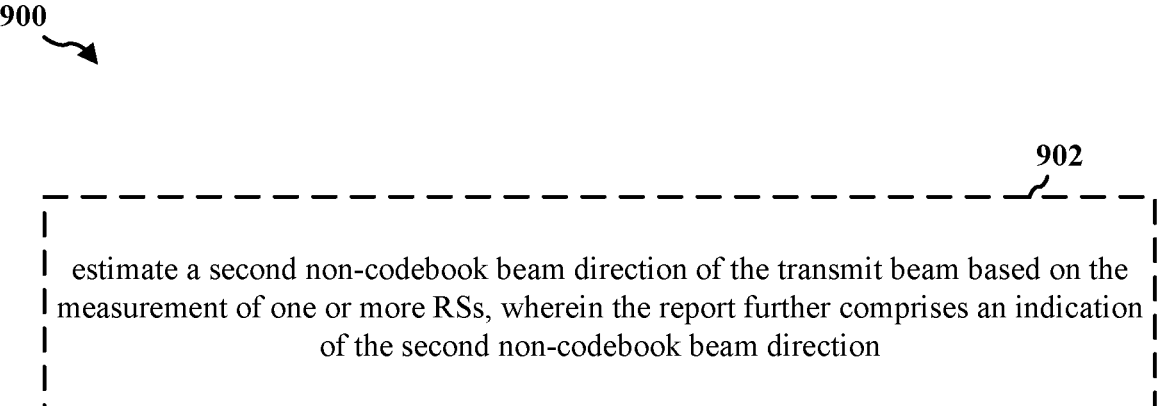
FIG. 9 is a flowchart of a method of wireless communication.

FIG. 9 is a flowchart 900 of a method of wireless communication. The method may be performed by a UE (e.g., the UE 104; the apparatus 1202). Block 902 is optional and may be used in conjunction with one or more of blocks illustrated in FIGS. 7-11. At 902, the UE may estimate a second non-codebook beam direction of the transmit beam based on the measurement of one or more RSs (e.g., as illustrated by the second process 514 of FIG. 5), wherein the report further comprises an indication of the second non-codebook beam direction (e.g., a report transmitted to the wireless node as illustrated by the fifth communication 516 of FIG. 5). For example, 902 may be performed by an estimating component 1242. Here, the UE may estimate that an optimal transmit beam has more than one main lobe. For example, the estimated non-codebook transmit beam may have multiple lobes as illustrated in FIG. 6. In some examples, the indication of the first non-codebook beam direction comprises a first angle of departure (AoD) of the first non-codebook beam direction, and wherein the indication of the second non-codebook beam direction comprises a second AoD of the second non-codebook beam direction.

Figure 10:
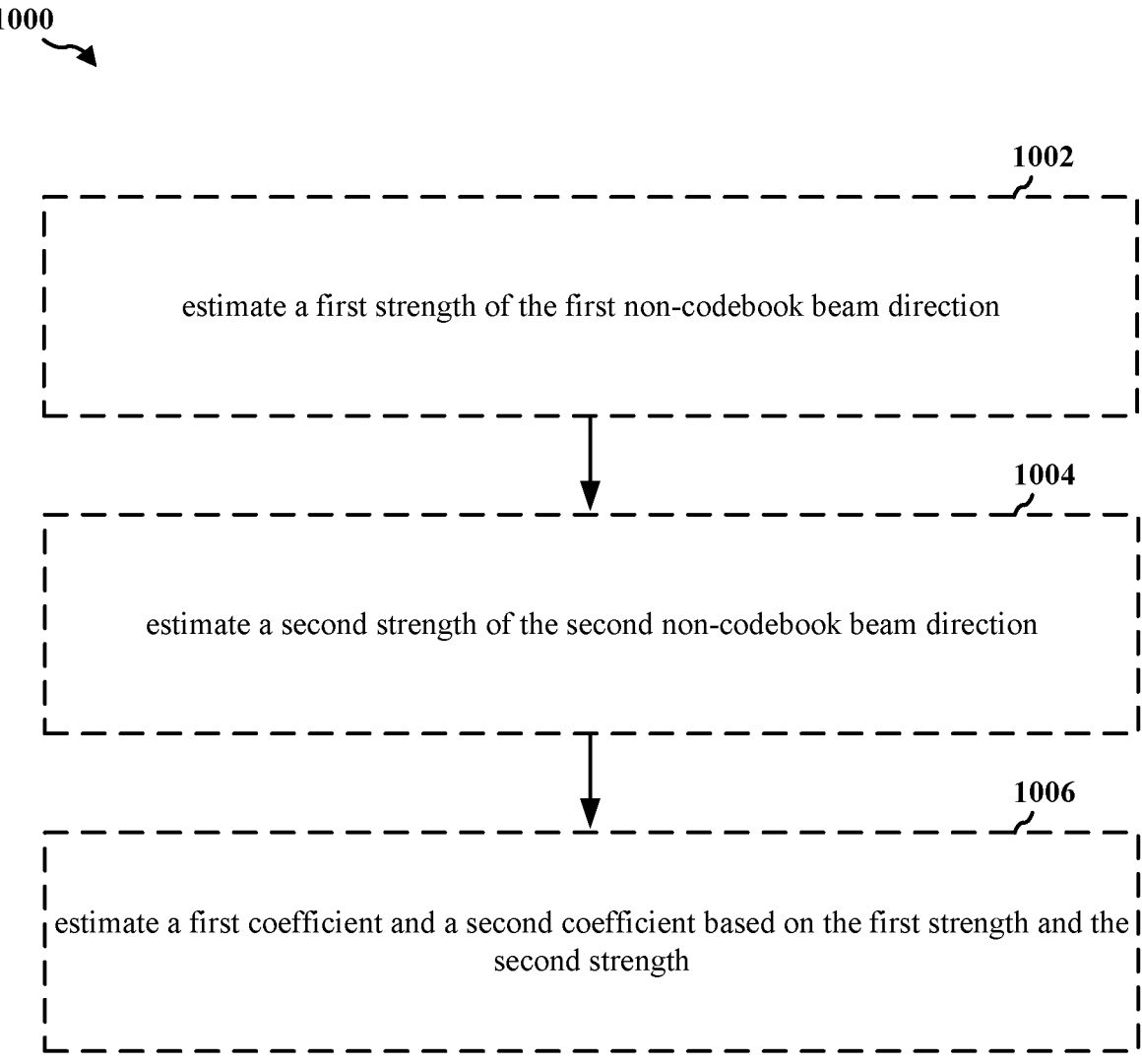
FIG. 10 is a flowchart of a method of wireless communication.

FIG. 10 is a flowchart 1000 of a method of wireless communication. The method may be performed by a UE (e.g., the UE 104; the apparatus 1202). Block 1002 is optional and may be used in conjunction with one or more of blocks illustrated in FIGS. 7-11. At 1002, the UE may estimate a first strength of the first non-codebook beam direction. For example, 1002 may be performed by the estimating component 1242. Here, a custom beam may have two main lobes, each of which are defined by a unique direction. For example, a first main lobe may have a first non-codebook beam direction, while a second main lobe may have a second non-codebook beam direction.

At 1004, the UE may estimate a second strength of the second non-codebook beam direction. For example, 1004 may be performed by the estimating component 1242.

At 1006, the UE may estimate a first coefficient and a second coefficient based on the first strength and the second strength, as illustrated in the second process 514 of FIG. 5. For example, 1002 may be performed by the estimating component 1242. Here, the UE may calculate a coefficient associated with a transmit beam having multiple beam directions. For example, if the transmit beam has two main lobes, the UE may calculate a coefficient for each of the two lobes based on the estimated strength of each corresponding main lobe. The coefficients may indicate a strength (e.g., transmit power) associated with each lobe relative to the other. In some examples, the indication of the first non-codebook beam direction comprises the first coefficient, and the indication of the second non-codebook beam direction comprises the second coefficient.

FIG. 11 is a flowchart 1100 of a method of wireless communication. The method may be performed by a UE (e.g., the UE 104; the apparatus 1202). Block 1102 is optional and may be used in conjunction with one or more of blocks illustrated in FIGS. 7-11. At 1102, the UE may obtain instructions for configuring content of the report, wherein the instructions include at least one of: a type of information for indicating the first non-codebook beam direction, a quantity of non-codebook beam directions allowed in the report, or a granularity of the information for indicating the first non-codebook beam direction, as illustrated by the second communication 504 of FIG. 5. For example, 1102 may be performed by the obtaining component 1240. Here, the network entity may configure the UE with the format and/or data of the report.

Figure 12:
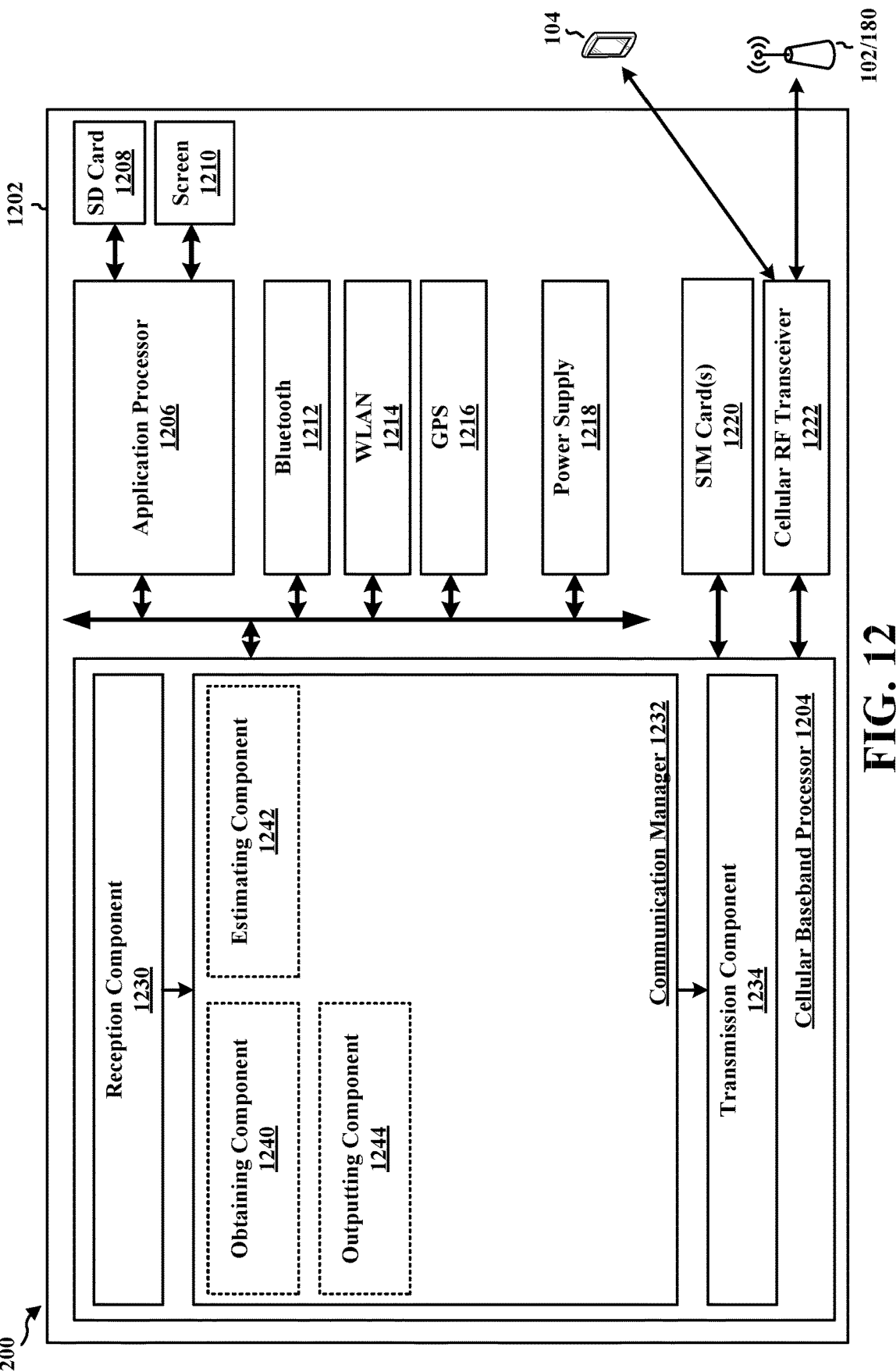
FIG. 12 is a diagram illustrating an example of a hardware implementation for an example apparatus.

FIG. 12 is a diagram 1200 illustrating an example of a hardware implementation for an apparatus 1202. In some examples, the apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. In various examples, the apparatus 1202 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory"). The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 104 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 104 of FIG. 3) and include the aforediscussed additional modules of the apparatus 1202.

The communication manager 1232 includes an obtaining component 1240 that is configured to obtain, from a wireless node, a plurality of reference signals (RSs) via one or more receive beams, wherein each of the one or more receive beams is characterized by one of a plurality of codebook beam directions; obtain assistance information comprising an indication of the plurality of codebook beam directions, wherein the first non-codebook beam direction is further based on the assistance information; and obtain instructions for configuring content of the report, wherein the instructions include at least one of: a type of information for indicating the first non-codebook beam direction, a quantity of non-codebook beam directions allowed in the report, or a granularity of the information for indicating the first non-codebook beam direction; e.g., as described in connection with 702 of FIG. 7, 802 of FIG. 8, and 1102 of FIG. 11.

The communication manager 1232 further includes an estimating component 1242 configured to estimate a first non-codebook beam direction of a transmit beam of the wireless node based on a measurement of one or more RSs of the plurality of RSs; estimate a second non-codebook beam direction of the transmit beam based on the measurement of one or more RSs, wherein the report further comprises an indication of the second non-codebook beam direction; and estimate a first strength of the first non-codebook beam direction; estimate a second strength of the second non-codebook beam direction; and estimate a first coefficient and a second coefficient based on the first strength and the second strength; e.g., as described in connection with 704 of FIG. 7, 902 of FIG. 9, and 1002 of FIG. 10.

The communication manager 1232 further includes an outputting component 1244 configured to output a report comprising an indication of the first non-codebook beam direction for transmission to the wireless node, e.g., as described in connection with 706 of FIG. 7.

The apparatus may include additional components that perform each of the blocks of the algorithm in the aforementioned flowcharts of FIGS. 7-11. As such, each block in the aforementioned flowcharts may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for obtaining, from a wireless node, a plurality of reference signals (RSs) via one or more receive beams, wherein each of the one or more receive beams is characterized by one of a plurality of codebook beam directions; means for estimating a first non-codebook beam direction of a transmit beam of the wireless node based on a measurement of one or more RSs of the plurality of RSs; means for outputting a report comprising an indication of the first non-codebook beam direction for transmission to the wireless node; means for obtaining assistance information comprising an indication of the plurality of codebook beam directions, wherein the first non-codebook beam direction is further based on the assistance information; means for estimating a second non-codebook beam direction of the transmit beam based on the measurement of one or more RSs, wherein the report further comprises an indication of the second non-codebook beam direction; means for estimating a first strength of the first non-codebook beam direction; estimate a second strength of the second non-codebook beam direction; and estimate a first coefficient and a second coefficient based on the first strength and the second strength; and means for obtaining instructions for configuring content of the report, wherein the instructions include at least one of: a type of information for indicating the first non-codebook beam direction, a quantity of non-codebook beam directions allowed in the report, or a granularity of the information for indicating the first non-codebook beam direction.

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

FIG. 13 is a flowchart 1300 of a method of wireless communication. The method may be performed by a base station (e.g., the base station 102/180; the apparatus 1402. At 1302, the base station may optionally output assistance information for transmission to the wireless node, the assistance information comprising an indication of the plurality of codebook beam directions. For example, 1302 may be performed by an outputting component 1440.

At 1304, the base station may optionally output instructions for transmission to the wireless node, the instructions for configuring content of the report, wherein the instructions include at least one of: a type of information for indicating the first non-codebook beam direction, a quantity of non-codebook beam directions allowed in the report, or a granularity of the information for indicating the first non-codebook beam direction. For example, 1304 may be performed by the outputting component 1440.

At 1308, the base station may output, to a wireless node, a plurality of reference signals (RSs) for transmission via one or more transmit beams, wherein each of the one or more transmit beams is characterized by one of a plurality of codebook beam directions. For example, 1308 may be performed by the outputting component 1440.

At 1310, the base station may obtain, from the wireless node, a report comprising an indication of a first non-codebook beam direction for a transmit beam of the apparatus, the first non-codebook beam direction based on the one or more RSs of the plurality of RSs. For example, 1310 may be performed by an obtaining component 1442.

At 1312, the base station may estimate a custom beam direction of the transmit beam based on the report. For example, 1312 may be performed by an estimating component 1444.

At 1314, the base station may optionally output, for transmission an indication of a custom beam direction of the transmit beam after obtaining the report. For example, 1314 may be performed by the outputting component 1440.

At 1316, the base station may optionally output, for transmission via the transmit beam characterized by the custom beam direction, signaling to the wireless node. For example, 1316 may be performed by the outputting component 1440.

In certain aspects, the report further comprises an indication of a second non-codebook beam direction of the transmit beam based on the one or more RSs.

In certain aspects, the indication of the first non-codebook beam direction comprises a first angle of departure (AoD) of the first non-codebook beam direction.

In certain aspects, the indication of the second non-codebook beam direction comprises a second AoD of the second non-codebook beam direction.

In certain aspects, the indication of the first non-codebook beam direction comprises a first coefficient.

In certain aspects, the indication of the second non-codebook beam direction comprises a second coefficient.

In certain aspects, the first coefficient is indicative of a first strength of the first non-codebook beam direction.

In certain aspects, the second coefficient is indicative of a second strength of the second non-codebook beam direction.

In certain aspects, the type of information includes at least one of an angle of departure (AoD) of the first non-codebook beam direction, or a coefficient indicating a weight of the first non-codebook beam direction.

Figure 14:
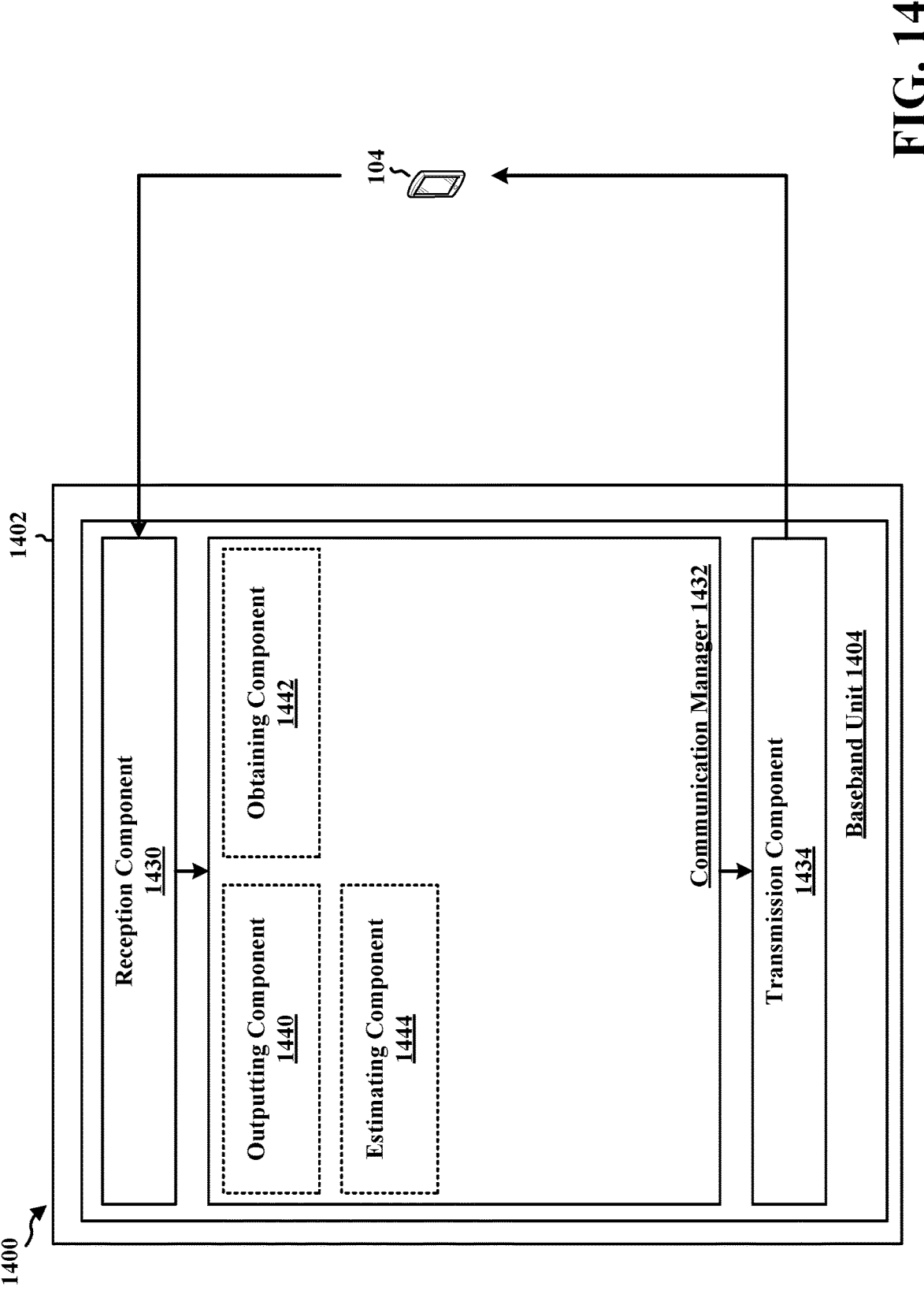
FIG. 14 is a diagram illustrating an example of a hardware implementation for another example apparatus.

FIG. 14 is a diagram 1400 illustrating an example of a hardware implementation for an apparatus 1402. In some examples, the apparatus 1402 is a BS and includes a baseband unit 1404. The baseband unit 1404 may communicate through a cellular RF transceiver with the UE 104. The baseband unit 1404 may include a computer-readable medium/memory. The baseband unit 1404 is responsible for general processing, including the execution of software stored on the computer-readable medium/memory. In various examples, the apparatus 1402 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory"). The software, when executed by the baseband unit 1404, causes the baseband unit 1404 to perform the various functions described supra. The computer-readable medium/memory may also be used for storing data that is manipulated by the baseband unit 1404 when executing software. The baseband unit 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the baseband unit 1404. The baseband unit 1404 may be a component of the BS 102/180 and may include the memory 376 and/or at least one of the TX processor 316, the RX processor 370, and the controller/processor 375.

The communication manager 1432 includes an outputting component 1440 configured to output assistance information for transmission to the wireless node, the assistance information comprising an indication of the plurality of codebook beam directions; output instructions for transmission to the wireless node, the instructions for configuring content of the report, wherein the instructions include at least one of: a type of information for indicating the first non-codebook beam direction, a quantity of non-codebook beam directions allowed in the report, or a granularity of the information for indicating the first non-codebook beam direction; output, to a wireless node, a plurality of reference signals (RSs) for transmission via one or more transmit beams, wherein each of the one or more transmit beams is characterized by one of a plurality of codebook beam directions; output, for transmission an indication of a custom beam direction of the transmit beam after obtaining the report; and output, for transmission via the transmit beam characterized by the custom beam direction, signaling to the wireless node; e.g., as described in connection with 1302, 1304, 1308, 1314, and 1316 of FIG. 13.

The communication manager 1432 further includes an obtaining component 1442 configured to obtain, from the wireless node, a report comprising an indication of a first non-codebook beam direction for a transmit beam of the apparatus, the first non-codebook beam direction based on the one or more RSs of the plurality of RSs, e.g., as described in connection with 1102/180 of FIG. 13.

The communication manager 1432 further includes an estimating component 1444 configured to estimate a custom beam direction of the transmit beam based on the report, e.g., as described in connection with 1312 of FIG. 13.

The apparatus may include additional components that perform each of the blocks of the algorithm in the aforementioned flowcharts of FIG. 13. As such, each block in the aforementioned flowchart may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the baseband unit 1404, includes means for outputting assistance information for transmission to the wireless node, the assistance information comprising an indication of the plurality of codebook beam directions; means for outputting instructions for transmission to the wireless node, the instructions for configuring content of the report, wherein the instructions include at least one of: a type of information for indicating the first non-codebook beam direction, a quantity of non-codebook beam directions allowed in the report, or a granularity of the information for indicating the first non-codebook beam direction; means for outputting, to a wireless node, a plurality of reference signals (RSs) for transmission via one or more transmit beams, wherein each of the one or more transmit beams is characterized by one of a plurality of codebook beam directions; means for obtaining, from the wireless node, a report comprising an indication of a first non-codebook beam direction for a transmit beam of the apparatus, the first non-codebook beam direction based on the one or more RSs of the plurality of RSs; means for estimating a custom beam direction of the transmit beam based on the report; means for outputting, for transmission an indication of a custom beam direction of the transmit beam after obtaining the report; and means for outputting, for transmission via the transmit beam characterized by the custom beam direction, signaling to the wireless node.

The aforementioned means may be one or more of the aforementioned components of the apparatus 1402 configured to perform the functions recited by the aforementioned means. As described supra, the apparatus 1402 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Additional Considerations

Means for receiving or means for obtaining may include a receiver, such as the receive processor 356/370 and/or an antenna(s) 320/352 of the BS 102/180 and UE 104 illustrated in FIG. 3. Means for transmitting or means for outputting may include a transmitter, such as the transmit processor 316/368 and/or an antenna(s) 320/352 of the BS 102/180 and UE 104 illustrated in FIG. 3. Means for estimating, means for determining, means for measuring, and/or means for performing may include a processing system, which may include one or more processors, such as the controller/processor 375/359 of the BS 102/180 and the UE 104 illustrated in FIG. 3.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the terms "estimating" (or any variants thereof such as "estimate") encompass a wide variety of actions. For example, "estimating" may include calculating, computing, processing, deriving, investigating, looking up (e.g., looking up in a table, a database or another data structure), ascertaining and the like. Also, "estimating" may include accessing (e.g., accessing data in a memory), resolving, selecting, choosing, establishing and the like.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, "a processor," "at least one processor" or "one or more processors" generally refers to a single processor configured to perform one or multiple operations or multiple processors configured to collectively perform one or more operations. In the case of multiple processors, performance the one or more operations could be divided amongst different processors, though one processor may perform multiple operations, and multiple processors could collectively perform a single operation. Similarly, "a memory," "at least one memory" or "one or more memories" generally refers to a single memory configured to store data and/or instructions, multiple memories configured to collectively store data and/or instructions.

Example Aspects

The following examples are illustrative only and may be combined with aspects of other embodiments or teachings described herein, without limitation.

Example 1 is a method of wireless communication at an apparatus, comprising: obtaining, from a wireless node, a plurality of reference signals (RSS) via one or more receive beams, wherein each of the one or more receive beams is characterized by one of a plurality of codebook beam directions; estimating a first non-codebook beam direction of a transmit beam of the wireless node based on a measurement of one or more RSs of the plurality of RSs; and outputting a report comprising an indication of the first non-codebook beam direction for transmission to the wireless node.

Example 2 is the method of example 1, further comprising: obtaining assistance information comprising an indication of the plurality of codebook beam directions, wherein the first non-codebook beam direction is further based on the assistance information.

Example 3 is the method of any of examples 1 and 2, further comprising: estimating a second non-codebook beam direction of the transmit beam based on the measurement of one or more RSs, wherein the report further comprises an indication of the second non-codebook beam direction.

Example 4 is the method of example 3, wherein the indication of the first non-codebook beam direction comprises a first angle of departure (AoD) of the first non-codebook beam direction, and wherein the indication of the second non-codebook beam direction comprises a second AoD of the second non-codebook beam direction.

Example 5 is the method of any of examples 3 and 4, further comprising: estimating a first strength of the first non-codebook beam direction; estimating a second strength of the second non-codebook beam direction; and estimating a first coefficient and a second coefficient based on a relative difference between the first strength and the second strength.

Example 6 is the method of example 5, wherein the indication of the first non-codebook beam direction comprises the first coefficient, and wherein the indication of the second non-codebook beam direction comprises the second coefficient.

Example 7 is the method of any of examples 1-6, further comprising: obtaining instructions for configuring content of the report, wherein the instructions include at least one of: a type of information for indicating the first non-codebook beam direction, a quantity of non-codebook beam directions allowed in the report, or a granularity of the information for indicating the first non-codebook beam direction.

Example 8 is the method of example 7, wherein the type of information includes at least one of an angle of departure (AoD) of the first non-codebook beam direction, or a coefficient indicating a weight of the first non-codebook beam direction.

Example 9 is the method of any of example 1-8, further comprising: obtaining, in response to the report, an indication of a custom beam direction of the transmit beam after outputting the report for transmission.

Example 10 is the method of example 9, further comprising: estimating a second non-codebook beam direction for obtaining signaling transmitted via the custom beam direction; and obtaining signaling via a receive beam of the one or more receive beams, wherein a direction associated with the receive beam is defined by the second non-codebook direction.

Example 11 is a method of wireless communication at an apparatus, comprising: outputting, to a wireless node, a plurality of reference signals (RSs) for transmission via one or more transmit beams, wherein each of the one or more transmit beams is characterized by one of a plurality of codebook beam directions; obtaining, from the wireless node, a report comprising an indication of a first non-codebook beam direction for a transmit beam of the apparatus, the first non-codebook beam direction based on the one or more RSs of the plurality of RSs; and estimating a custom beam direction of the transmit beam based on the report.

Example 12 is the method of example 11, further comprising: outputting assistance information for transmission to the wireless node, the assistance information comprising an indication of the plurality of codebook beam directions.

Example 13 is the method of any of examples 11 and 12, wherein the report further comprises an indication of a second non-codebook beam direction of the transmit beam based on the one or more RSs.

Example 14 is the method of example 13, wherein the indication of the first non-codebook beam direction comprises a first angle of departure (AoD) of the first non-codebook beam direction, and wherein the indication of the second non-codebook beam direction comprises a second AoD of the second non-codebook beam direction.

Example 15 is the method of any of examples 13 and 14, wherein the indication of the first non-codebook beam direction comprises a first coefficient, and wherein the indication of the second non-codebook beam direction comprises a second coefficient, wherein the first coefficient is indicative of a first strength of the first non-codebook beam direction, and wherein the second coefficient is indicative of a second strength of the second non-codebook beam direction.

Example 16 is the method of any of examples 11-15, further comprising: outputting instructions for transmission to the wireless node, the instructions for configuring content of the report, wherein the instructions include at least one of: a type of information for indicating the first non-codebook beam direction, a quantity of non-codebook beam directions allowed in the report, or a granularity of the information for indicating the first non-codebook beam direction.

Example 17 is the method of example 16, wherein the type of information includes at least one of an angle of departure (AoD) of the first non-codebook beam direction, or a coefficient indicating a weight of the first non-codebook beam direction.

Example 18 is the method of any of examples 11-17, further comprising: outputting, for transmission in response to the report, an indication of a custom beam direction of the transmit beam after obtaining the report.

Example 19 is the method of example 18, further comprising: outputting, for transmission via the transmit beam characterized by the custom beam direction, signaling to the wireless node.

Example 20 is a UE, comprising: a transceiver; a memory comprising instructions; and one or more processors configured to execute the instructions to cause the UE to perform a method in accordance with any one of examples 1-10, wherein the transceiver is configured to: receive the plurality of reference signals (RSs); and transmit the report.

Example 21 is a network entity, comprising: a transceiver; a memory comprising instructions; and one or more processors configured to execute the instructions and cause the network entity to perform a method in accordance with any one of examples 11-19, wherein the transceiver is configured to: transmit the plurality of reference signals; and receive the report.

Example 22 is an apparatus for wireless communications, comprising means for performing a method in accordance with any one of examples 1-10.

Example 23 is an apparatus for wireless communications, comprising means for performing a method in accordance with any one of examples 11-19.

Example 24 is a non-transitory computer-readable medium comprising instructions that, when executed by an apparatus, cause the apparatus to perform a method in accordance with any one of examples 1-10.

Example 25 is a non-transitory computer-readable medium comprising instructions that, when executed by an apparatus, cause the apparatus to perform a method in accordance with any one of examples 11-19.

Example 26 is an apparatus for wireless communications, comprising: a memory comprising instructions; and one or more processors configured to execute the instructions to cause the apparatus to perform a method in accordance with any one of examples 1-10.

Example 27 is apparatus for wireless communications, comprising: a memory comprising instructions; and one or more processors configured to execute the instructions to cause the apparatus to perform a method in accordance with any one of examples 11-19.

What is claimed is:

1. An apparatus configured for wireless communication, comprising:
at least one transceiver;
at least one memory comprising instructions; and
one or more processors configured to execute the instructions to cause the apparatus to:
receive, via the at least one transceiver and from a wireless node, a plurality of reference signals (RSs) via one or more receive beams, wherein each of the one or more receive beams is characterized by one of a plurality of codebook beam directions;
estimate a first non-codebook beam direction of a transmit beam of the wireless node based on a measurement of one or more RSs of the plurality of RSs;
estimate a second non-codebook beam direction of the transmit beam based on the measurement of one or more RSs;
estimate a first coefficient based on a first strength of the first non-codebook beam direction and a second coefficient based on a second strength of the second non-codebook beam direction; and
transmit, via the at least one transceiver and to the wireless node, a report comprising the first coefficient and the second coefficient.

2. The apparatus of claim 1, wherein the one or more processors are further configured to cause the apparatus to:
receive, via the at least one transceiver, assistance information comprising an indication of the plurality of codebook beam directions, wherein the first non-codebook beam direction is further based on the assistance information.

3. The apparatus of claim 1, wherein the report further indicates a first angle of departure (AoD) of the first non-codebook beam direction, and a second AoD of the second non-codebook beam direction.

4. The apparatus of claim 1, wherein the one or more processors are further configured to cause the apparatus to:
receive, via the at least one transceiver, instructions for configuring content of the report, wherein the instructions include at least one of:
a type of information for indicating the first non-codebook beam direction,
a quantity of non-codebook beam directions allowed in the report, or
a granularity of the information for indicating the first non-codebook beam direction.

5. The apparatus of claim 4, wherein the type of information includes at least one of an angle of departure (AoD) of the first non-codebook beam direction, or a coefficient indicating a weight of the first non-codebook beam direction.

6. The apparatus of claim 1, wherein the one or more processors are further configured to cause the apparatus to:
receive, via the at least one transceiver, an indication of a custom beam direction of the transmit beam after transmitting the report.

7. The apparatus of claim 6, wherein the one or more processors are further configured to cause the apparatus to:
receive, via the at least one transceiver, signaling via a receive beam of the one or more receive beams, wherein a direction associated with the receive beam is defined by the second non-codebook beam direction.

8. The apparatus of claim 1,
wherein the apparatus is configured to operate as a user equipment (UE).

9. An apparatus configured for wireless communication, comprising:
at least one transceiver;
at least one memory comprising instructions; and
one or more processors configured to execute the instructions to cause the apparatus to:
transmit, via the at least one transceiver and to a wireless node, a plurality of reference signals (RSs) for transmission via one or more transmit beams, wherein each of the one or more transmit beams is characterized by one of a plurality of codebook beam directions;
receive, via the at least one transceiver and from the wireless node, a report comprising a first coefficient based on a first strength of a first non-codebook beam direction estimated from a first one of the plurality of RSs and a second coefficient based on a second strength of a second non-codebook beam direction estimated from a second one of the plurality of RS; and
estimate a custom beam direction of a transmit beam based on the report.

10. The apparatus of claim 9, wherein the one or more processors are further configured to cause the apparatus to:
transmit, via the at least one transceiver, assistance information for transmission to the wireless node, the assistance information comprising an indication of the plurality of codebook beam directions.

11. The apparatus of claim 9, wherein the report further indicates a first angle of departure (AoD) of the first non-codebook beam direction, and a second AoD of the second non-codebook beam direction.

12. The apparatus of claim 9, wherein the one or more processors are further configured to cause the apparatus to:

transmit, via the at least one transceiver, instructions for transmission to the wireless node, the instructions for configuring content of the report, wherein the instructions include at least one of:

a type of information for indicating the first non-codebook beam direction, a quantity of non-codebook beam directions allowed in the report, or a granularity of the information for indicating the first non-codebook beam direction.

13. The apparatus of claim 12, wherein the type of information includes at least one of an angle of departure (AoD) of the first non-codebook beam direction, or a coefficient indicating a weight of the first non-codebook beam direction.

14. The apparatus of claim 9, wherein the one or more processors are further configured to cause the apparatus to:

transmit, via the at least one transceiver, an indication of the custom beam direction of the transmit beam after receiving, via the at least one transceiver, the report.

15. The apparatus of claim 14, wherein the one or more processors are further configured to cause the apparatus to:

transmit, via the at least one transceiver, for transmission via the transmit beam characterized by the custom beam direction, signaling to the wireless node.

16. The apparatus of claim 9, wherein the apparatus is configured to operate as a network entity.

17. A method for wireless communications by a first wireless node, comprising:

receiving, from a second wireless node, a plurality of reference signals (RSs) via one or more receive beams, wherein each of the one or more receive beams is characterized by one of a plurality of codebook beam directions;

estimating a first non-codebook beam direction of a transmit beam of the second wireless node based on a measurement of one or more RSs of the plurality of RSs;

estimating a second non-codebook beam direction of the transmit beam based on the measurement of one or more RSs;

estimating a first coefficient based on a first strength of the first non-codebook beam direction and a second coefficient based on a second strength of the second non-codebook beam direction; and transmitting, to the second wireless node, a report comprising the first coefficient and the second coefficient.

18. The method of claim 17, further comprising:

receiving assistance information comprising an indication of the plurality of codebook beam directions, wherein the first non-codebook beam direction is further based on the assistance information.

19. The method of claim 17, wherein the report further indicates a first angle of departure (AoD) of the first non-codebook beam direction, and a second AoD of the second non-codebook beam direction.

20. The method of claim 17, further comprising:

receiving instructions for configuring content of the report, wherein the instructions include at least one of:

a type of information for indicating the first non-codebook beam direction, a quantity of non-codebook beam directions allowed in the report, or a granularity of the information for indicating the first non-codebook beam direction.

21. The method of claim 17, further comprising:

receiving an indication of a custom beam direction of the transmit beam after transmitting the report.

22. The method of claim 21, further comprising:

receiving signaling via a receive beam of the one or more receive beams, wherein a direction associated with the receive beam is defined by the second non-codebook beam direction.

* * * * *